United States Patent
Greenberg et al.

(10) Patent No.: US 10,002,491 B2
(45) Date of Patent: Jun. 19, 2018

(54) CONTROLLING GAMING EFFECTS ON AVAILABLE PRESENTATION DEVICES OF GAMING NETWORK NODES

(75) Inventors: Jacob C. Greenberg, Elgin, IL (US); Timothy T. Gronkowski, Chicago, IL (US); John Michael Holmes, Chicago, IL (US); Timothy C. Loose, Chicago, IL (US); Martin R. Ugarte, Jr., Chicago, IL (US); Muthu Velu, Schaumburg, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 980 days.

(21) Appl. No.: 13/382,783

(22) PCT Filed: Jul. 6, 2010

(86) PCT No.: PCT/US2010/041111
§ 371 (c)(1),
(2), (4) Date: Mar. 26, 2012

(87) PCT Pub. No.: WO2011/005797
PCT Pub. Date: Jan. 13, 2011

(65) Prior Publication Data
US 2012/0178523 A1 Jul. 12, 2012

Related U.S. Application Data

(60) Provisional application No. 61/223,574, filed on Jul. 7, 2009.

(51) Int. Cl.
*A63F 9/24* (2006.01)
*G07F 17/32* (2006.01)
*A63F 13/52* (2014.01)

(52) U.S. Cl.
CPC .......... *G07F 17/3227* (2013.01); *A63F 13/52* (2014.09); *G07F 17/3211* (2013.01); *G07F 17/3223* (2013.01)

(58) Field of Classification Search
CPC .......... A63F 2300/402; A63F 2300/554; A63F 13/12; A63F 2300/5533; A63F 13/10;
(Continued)

(56) References Cited

U.S. PATENT DOCUMENTS 5,483,631 A   1/1996  Nagai et al.
5,633,933 A   5/1997  Aziz
(Continued)

FOREIGN PATENT DOCUMENTS

EP   1439507       7/2004
WO   WO2004086320   10/2001
(Continued)

OTHER PUBLICATIONS

PCT Application No. PCT/US10/41112 International Preliminary Report on Patentability, Aug. 31, 2012, 4 pages.
(Continued)

*Primary Examiner* — Justin Myhr
(74) *Attorney, Agent, or Firm* — DeLizio Law, PLLC

(57) ABSTRACT

A wagering game system and its operations are described herein. In embodiments, the operations can include determining a bank gaming effect for presentation on a bank of content presentation devices. The bank of content presentation devices can be associated with a plurality of wagering game machines. The operations can further include receiving presentation status information for the bank of content presentation devices. The presentation status information can indicate one or more events that affect a state of availability of each of the bank of content presentation devices to present the bank gaming effect. The operations
(Continued)

can further include determining, based on the presentation status information, one content presentation device, from the bank of content presentation devices, that is ineligible to present the bank gaming effect. The operations can also include excluding the one content presentation device from participation in the bank gaming effect.

21 Claims, 8 Drawing Sheets

(58) Field of Classification Search
CPC ............ G07F 17/3202; G07F 17/3211; G07F 17/3223; G07F 17/3225
USPC .......................................... 463/30–34, 40–42
See application file for complete search history.

(56) References Cited

U.S. PATENT DOCUMENTS

| | | |
|---|---|---|
| 6,040,831 A | 3/2000 | Nishida |
| 6,081,266 A | 6/2000 | Sciammaella |
| 6,146,273 A | 11/2000 | Olsen |
| 6,217,448 B1 | 4/2001 | Olsen |
| 6,647,119 B1 | 11/2003 | Slezak |
| 6,843,723 B2 | 1/2005 | Joshi |
| 6,939,226 B1 | 9/2005 | Joshi |
| 6,960,136 B2 | 11/2005 | Joshi et al. |
| 6,972,528 B2 | 12/2005 | Shao et al. |
| 6,974,385 B2 | 12/2005 | Joshi et al. |
| 6,991,543 B2 | 1/2006 | Joshi |
| 6,997,803 B2 | 2/2006 | LeMay et al. |
| 7,082,572 B2 | 7/2006 | Pea et al. |
| 7,112,139 B2 | 9/2006 | Paz Barahona et al. |
| 7,228,190 B2 | 6/2007 | Dowling et al. |
| 7,364,508 B2 | 4/2008 | Loose et al. |
| 7,367,886 B2 | 5/2008 | Loose et al. |
| 7,449,839 B1 | 11/2008 | Chen et al. |
| 7,479,063 B2 | 1/2009 | Pryzby et al. |
| 7,666,091 B2 | 2/2010 | Joshi et al. |
| 7,682,249 B2 | 3/2010 | Winans et al. |
| 7,811,170 B2 | 10/2010 | Winans et al. |
| 8,083,587 B2 | 12/2011 | Okada |
| 2001/0021666 A1 | 9/2001 | Yoshida et al. |
| 2002/0010018 A1 | 1/2002 | Lemay et al. |
| 2002/0055978 A1 | 5/2002 | Joon-Boo et al. |
| 2002/0160826 A1 | 10/2002 | Gomez et al. |
| 2003/0007648 A1 | 1/2003 | Currell |
| 2003/0017865 A1 | 1/2003 | Beaulieu et al. |
| 2003/0130033 A1 | 7/2003 | Loose |
| 2003/0132722 A1 | 7/2003 | Chansky et al. |
| 2004/0072610 A1 | 4/2004 | White et al. |
| 2004/0142747 A1 | 7/2004 | Pryzby |
| 2004/0160199 A1 | 8/2004 | Morgan et al. |
| 2005/0043090 A1 | 2/2005 | Pryzby et al. |
| 2005/0044500 A1 | 2/2005 | Orimoto et al. |
| 2005/0054440 A1 | 3/2005 | Anderson et al. |
| 2005/0077843 A1 | 4/2005 | Benditt |
| 2005/0116667 A1 | 6/2005 | Mueller et al. |
| 2005/0128751 A1 | 6/2005 | Roberge et al. |
| 2005/0164785 A1 | 7/2005 | Connelly |
| 2005/0164786 A1 | 7/2005 | Connelly |
| 2005/0164787 A1 | 7/2005 | Connelly |
| 2005/0164788 A1 | 7/2005 | Grabiec |
| 2005/0174473 A1 | 8/2005 | Morgan et al. |
| 2005/0239545 A1 | 10/2005 | Rowe |
| 2005/0248299 A1 | 11/2005 | Chemel et al. |
| 2005/0275626 A1 | 12/2005 | Mueller et al. |
| 2005/0277469 A1 | 12/2005 | Pryzby et al. |
| 2005/0282631 A1 | 12/2005 | Bonney et al. |
| 2006/0009285 A1 | 1/2006 | Pryzby et al. |
| 2006/0022214 A1 | 2/2006 | Morgan et al. |
| 2006/0025211 A1 | 2/2006 | Wilday et al. |
| 2006/0046829 A1 | 3/2006 | White |
| 2006/0076908 A1 | 4/2006 | Morgan et al. |
| 2006/0253781 A1 | 11/2006 | Pea et al. |
| 2007/0008711 A1 | 1/2007 | Kim |
| 2007/0036368 A1 | 2/2007 | Hettinger et al. |
| 2007/0086754 A1 | 4/2007 | Lys et al. |
| 2007/0111776 A1 | 5/2007 | Griswold et al. |
| 2007/0189026 A1 | 8/2007 | Chemel et al. |
| 2007/0218970 A1 | 9/2007 | Patel et al. |
| 2007/0218974 A1 | 9/2007 | Patel et al. |
| 2007/0291483 A1 | 12/2007 | Lys |
| 2007/0293304 A1 | 12/2007 | Loose et al. |
| 2008/0039213 A1 | 2/2008 | Cornell et al. |
| 2008/0070685 A1 | 3/2008 | Pryzby et al. |
| 2008/0094005 A1 | 4/2008 | Rabiner et al. |
| 2008/0113715 A1 | 5/2008 | Beadell et al. |
| 2008/0113796 A1 | 5/2008 | Beadell et al. |
| 2008/0113821 A1* | 5/2008 | Beadell et al. ................. 463/46 |
| 2008/0161108 A1 | 7/2008 | Dahl et al. |
| 2008/0176647 A1 | 7/2008 | Acres |
| 2008/0231203 A1 | 9/2008 | Budde et al. |
| 2008/0278946 A1 | 11/2008 | Tarter et al. |
| 2008/0288607 A1 | 11/2008 | Muchow |
| 2008/0309259 A1 | 12/2008 | Snijder et al. |
| 2009/0009997 A1 | 1/2009 | Sanfilippo et al. |
| 2009/0023485 A1 | 1/2009 | Ishihata et al. |
| 2009/0170597 A1 | 7/2009 | Bone et al. |
| 2009/0197673 A1 | 8/2009 | Bone et al. |
| 2009/0203427 A1 | 8/2009 | Okada |
| 2009/0206773 A1 | 8/2009 | Chang |
| 2009/0270167 A1 | 10/2009 | Ajiro et al. |
| 2009/0298579 A1 | 12/2009 | Radek et al. |
| 2009/0318223 A1 | 12/2009 | Langridge et al. |
| 2010/0022298 A1 | 1/2010 | Kukita |
| 2010/0022305 A1 | 1/2010 | Yano |
| 2010/0029385 A1 | 2/2010 | Garvey et al. |
| 2010/0031186 A1 | 2/2010 | Tseng et al. |
| 2010/0035404 A1 | 2/2010 | Li |
| 2010/0075750 A1 | 3/2010 | Bleich et al. |
| 2010/0113136 A1 | 5/2010 | Joshi et al. |
| 2010/0171145 A1 | 7/2010 | Morgan et al. |
| 2010/0213876 A1 | 8/2010 | Adamson et al. |
| 2010/0234107 A1 | 9/2010 | Fujimoto et al. |
| 2010/0277079 A1 | 11/2010 | Van der Veen et al. |
| 2010/0309016 A1 | 12/2010 | Wendt et al. |
| 2010/0317437 A1 | 12/2010 | Berry et al. |
| 2011/0045905 A1 | 2/2011 | Radek |
| 2011/0050101 A1 | 3/2011 | Bailey et al. |
| 2011/0118018 A1 | 5/2011 | Toyoda |
| 2011/0190052 A1 | 8/2011 | Takeda et al. |
| 2012/0009995 A1 | 1/2012 | Osgood |
| 2012/0040738 A1 | 2/2012 | Lanning et al. |
| 2012/0115608 A1 | 5/2012 | Pfeifer et al. |
| 2012/0129601 A1 | 5/2012 | Gronkowski et al. |
| 2012/0178528 A1 | 7/2012 | Brunell et al. |
| 2013/0184078 A1 | 7/2013 | Brunell et al. |

FOREIGN PATENT DOCUMENTS

| | | |
|---|---|---|
| WO | WO-2004014501 | 2/2004 |
| WO | WO2004075128 | 9/2004 |
| WO | WO2004075129 | 9/2004 |
| WO | WO2005113089 | 12/2005 |
| WO | WO2005114598 | 12/2005 |
| WO | WO2005114599 | 12/2005 |
| WO | WO2005117647 | 12/2005 |
| WO | WO2006017444 | 2/2006 |
| WO | WO2006017445 | 2/2006 |
| WO | WO2006033941 | 3/2006 |
| WO | WO2006039284 | 4/2006 |
| WO | WO2006039323 | 4/2006 |
| WO | WO2006125013 | 11/2006 |
| WO | WO2007022294 | 2/2007 |
| WO | WO2007022343 | 2/2007 |
| WO | WO-2007061904 | 5/2007 |
| WO | WO2007133566 | 11/2007 |
| WO | WO2008057538 | 5/2008 |
| WO | WO2008063391 | 5/2008 |
| WO | WO2008137130 | 11/2008 |
| WO | WO2009054930 | 4/2009 |
| WO | WO2010048068 | 4/2010 |

(56) References Cited

FOREIGN PATENT DOCUMENTS

| WO | WO2011005797 | 1/2011 |
|---|---|---|
| WO | WO2011005798 | 1/2011 |
| WO | WO2011014760 | 2/2011 |
| ZA | 20041110 | 8/2005 |

OTHER PUBLICATIONS

U.S. Appl. No. 12/797,756, filed Jun. 10, 2010, Berry, Robert G., et al.
U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/109,427, filed May 17, 2011, Brunell, Ed et al.
U.S. Appl. No. 13/094,560, filed Apr. 26, 2012, Brunell, Eward G., et al.
PCT Application No. PCT/US10/41111 International Preliminary Report on Patentability, Oct. 24, 2011 , 13 pages.
PCT Application No. PCT/US10/41111 International Search Report, Sep. 1, 2010 , 12 pages.
PCT Application No. PCT/US10/41112 International Search Report, Sep. 2, 2010 , 11 pages.
PCT Application No. PCT/US10/43886 International Search Report, Sep. 16, 2010 , 12 pages.
U.S. Appl. No. 13/382,738 Office Action, Feb. 7, 2013 , 41 pages.
PCT Application No. PCT/US10/43886 International Preliminary Report on Patentability, May 3, 2012 , 4 pages.
U.S. Appl. No. 12/860,467 Office Action, Jan. 17, 2013 , 16 pages.
U.S. Appl. No. 12/965,749 Final Office Action, Apr. 22, 2013 , 30 pages.
U.S. Appl. No. 12/965,749 Office Action, Nov. 8, 2012 , 30 pages.
U.S. Appl. No. 12/971,544 Final Office Action, Mar. 14, 2013 , 38 pages.
U.S. Appl. No. 12/971,544 Office Action, Nov. 6, 2012 , 43 pages.
U.S. Appl. No. 13/094,560 Office Action, Mar. 30, 2012 , 13 pages.
U.S. Appl. No. 13/094,701 Final Office Action, Nov. 28, 2012 , 14 pages.
U.S. Appl. No. 13/094,701 Office Action, Mar. 27, 2012 , 26 pages.
U.S. Appl. No. 13/094,811 Office Action, Apr. 3, 2012 , 16 pages.
U.S. Appl. No. 13/204,225 Final Office Action, Sep. 25, 2013 , 16 Pages.
U.S. Appl. No. 13/204,225 Office Action, Feb. 27, 2013 , 19 pages.
U.S. Appl. No. 13/204,225 Office Action, Jun. 22, 2012 , 23 pages.
U.S. Appl. No. 13/382,738 Office Action, Sep. 24, 2013 , 24 Pages.
Gusella, Riccardo et al., "An Election Algorithm for a Distributed Clock Synchronization Program", *Berkley* http://www.eecs.berkeley.edu/Pubs/TechRpts/1986/CSD-86-275.pdf Dec. 1985 , 19 pages.
U.S. Appl. No. 13/382,738 Final Office Action, Mar. 12, 2014, 23 Pages.
"U.S. Appl. No. 13/382,738 Final Office Action", dated Jul. 8, 2014, 20 Pages.

* cited by examiner

CONTROLLING GAMING EFFECTS ON AVAILABLE PRESENTATION DEVICES OF GAMING NETWORK NODES

RELATED APPLICATIONS

This application claims the priority benefit of U.S. Provisional Application Ser. No. 61/223,574 filed Jul. 7, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control gaming effects in wagering game networks.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a computer-implemented method comprises determining a bank gaming effect for presentation on a bank of content presentation devices associated with a plurality of wagering game machines; receiving presentation status information for the bank of content presentation devices, associated with the plurality of wagering game machines, wherein the presentation status information indicates one or more events that affect a state of availability of each of the bank of content presentation devices to present the bank gaming effect; determining, based on the presentation status information, one content presentation device, from the bank of content presentation devices, that is ineligible to present the bank gaming effect; and excluding the one content presentation device from participation in the bank gaming effect.

In some embodiments, the one or more events relate to a content presentation event associated with the one content presentation device and further comprising: determining a first presentation priority value associated with the content presentation event; determining a second presentation priority value associated with the bank gaming effect; and determining that the first presentation priority value exceeds the second presentation priority value in presentation importance.

In some embodiments, the content presentation event comprises one or more of an lighting event that requires access to the one content presentation device and a wagering game related event that prohibits use of the content presentation device.

In some embodiments, the computer-implemented method further comprises monitoring the presentation status information for a change in the one or more events that affect a state of availability; determining, based on the presentation status information, that the one or more events makes the one content presentation device eligible to present the bank gaming effect; and sending content control data to the one content presentation device.

In some embodiments, the presentation status information includes an indication of lighting data sent from one or more lighting control sources to the one content presentation device, and further comprises: determining, from the presentation status information, that the one or more lighting control sources have priority access to the one content presentation device.

In some embodiments, the bank gaming effect is a span effect that spans the bank of content presentation devices.

In some embodiments, determining the one content presentation device further comprises: determining that the bank gaming effect includes a distinct content element that is distinct from other content elements of the bank gaming effect, determining an unavailability to present the distinct content element on or more of the one content presentation device and one or more additional content presentation devices associated with the one content presentation device, and determining that the distinct content element would be omitted from a presentation of the bank gaming effect because of the unavailability.

In some embodiments, excluding the one content presentation device from participation in the bank gaming effect comprises: generating a transmission schedule that synchronizes timing of transmissions of content control data to the bank of content presentation devices, excluding the one content presentation device from the transmission schedule, and omitting the one content presentation device from transmissions of the content control data for the bank gaming effect.

In some embodiments, the computer-implemented further comprises: determining, based on the presentation status information, eligible lighting devices, from the bank of content presentation devices, that are eligible to present the bank gaming effect; including the eligible lighting devices in the transmission schedule; and transmitting the content control data, according to the transmission schedule, to the eligible lighting devices.

In some embodiments, one or more machine-readable media having instructions stored thereon, which when executed by a set of one or more processors causes the set of one or more processors to perform operations comprises determining a multi-media bank effect for presentation on a bank of presentation devices associated with a plurality of wagering game machines; receiving presentation status information for the bank of presentation devices associated with a plurality of wagering game machines, wherein the presentation status information indicates one or more events that affect a state of availability of each of bank of presentation devices to present the multi-media bank effect; determining, based on the presentation status information, ineligible presentation devices that are ineligible to present the multi-media bank effect, wherein the ineligible presentation devices comprise a first subset of the bank of presentation devices; determining, based on the presentation status information, eligible presentation devices that are eligible to present the multi-media bank effect, wherein the eligible presentation devices comprise a second subset of the bank of presentation devices; and providing bank-effect control data to present the multi-media bank effect exclusively on the second subset of the bank of presentation devices.

In some embodiments, the operation for providing the bank-effect control data includes operations further comprises transmitting the bank-effect control data to only the eligible presentation devices.

In some embodiments, the operations further comprise: generating the bank-effect control data to present the multimedia bank effect in a continuous, synchronized pattern across the bank of presentation devices; including instructions in the bank effect control data to exclude the ineligible presentation devices as participating nodes in the synchronized pattern; and transmitting the bank effect data to both the eligible presentation devices and the ineligible presentation devices.

In some embodiments, the operations further comprise: determining that the multi-media bank effect includes a distinct content element that is distinct from other content elements of the multi-media bank effect; determining an unavailability by the ineligible presentation devices to present the distinct content element; determining that the distinct content element would be omitted from a presentation of the multi-media bank effect because of the unavailability; and excluding the ineligible presentation devices from a transmission of the bank-effect control data.

In some embodiments, the operations further comprise: determining that the distinct content element is associated with a wagering game outcome; and determining that omission of the distinct content element would interrupt a presentation of the wagering game outcome.

In some embodiments, a system comprises a status control module configured to provide status information for at least one presentation device from a bank of presentation devices, wherein the status information indicates a state of availability of the at least one presentation device to present a synchronized gaming content presentation; and a content controller configured to generate content control data for the synchronized gaming content presentation, wherein the content control data controls timing of the synchronized gaming content presentation on the bank of presentation devices, receive the status information for the at least one presentation device, determine, based on the status information, that the at least one presentation device is unavailable to participate in the synchronized gaming content presentation, and control the content control data to exclude the at least one presentation device from participation in the synchronized gaming content presentation.

In some embodiments, the system further comprises an additional content controller configured to provide additional content control data related to a gaming effect that is separate from the synchronized gaming content presentation, and provide a first priority value with the additional content control data, wherein the first priority value indicates a presentation priority for the additional content control data to access the least one presentation device, and wherein the status control module is further configured to receive the additional content control data, determine the first priority value from the additional content control data, and include the first priority value in the presentation status information, and wherein the content controller is further configured to determine a second priority value associated with the content control data, determine that the first presentation priority value exceeds the second presentation priority value, determine that the additional content controller has priority access to the at least one presentation device and, as a result, omits presentation of at least a portion of the synchronized gaming content presentation, and exclude the at least one presentation device from a transmission of the content control data.

In some embodiments, one or more of the content controller and the additional content controller comprises one or more of a wagering game application, a wagering game server, a casino-network emotive lighting controller, a community wagering game server, and a wagering game machine bank controller.

In some embodiments, an apparatus comprises a content controller configured to receive a first request, from a first casino-content source, to present a first content on a content presentation device connected to the content controller, wherein the first content is associated with a first gaming effect, receive a second request, from a second casino-content source, to present a second content on the content presentation device, wherein the second content is associated with a second gaming effect, determine that the first request has priority over the second request, generate status information that indicates that the content presentation device is unavailable to present the second content on the content presentation device, and provide the status information to the second casino-content source.

In some embodiments, the content controller is further configured to determine a first priority value associated with the first request, wherein the first priority value indicates priority access to present the first content on the content presentation device, determine a second priority value associated with the second request, and determine that the first priority value transcends the second priority value in a numerical rank.

In some embodiments, the content controller is further configured to receive first content control data, from the first casino-content source, for the first content, present the first gaming effect on the content presentation device based on the first content control data, receive second content control data, from the second casino-content source, for the second content, and determine instructions, included in the second content control data, to exclude the content presentation device from participating in the second wagering game effect.

In some embodiments, an apparatus comprises means for determining a bank gaming effect for presentation on a bank of content presentation devices associated with a plurality of wagering game machines; means for determining that the bank gaming effect includes a distinct content element that is distinct from other content elements of the bank gaming effect; means for receiving presentation status information for at least one content presentation device from the bank of content presentation devices, wherein the presentation status information indicates a state of availability of the at least one content presentation device to present the bank gaming effect; means for determining, based on the presentation status information, that the at least one content presentation device is unavailable to present the distinct content element from the bank gaming effect; and means for excluding the one content presentation device from participation in the bank gaming effect.

In some embodiments, the at least one content presentation device comprises one or more of a lighting device, a sound production device, and one or more peripheral devices associated with the content presentation device.

In some embodiments, the distinct content element is a visually distinct lighting element, and further comprising: means for determining that the ineligible presentation device would omit the presentation of the visually distinct lighting element because of its ineligibility.

In some embodiments, the distinct content element is an audibly distinct sound element, and further comprising: means for determining that presentation device would omit the presentation of the audibly distinct sound element.

In some embodiments, the distinct content element reveals a gaming outcome, and wherein the distinct content element is required to be presented at all times during the bank gaming effect.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1A:
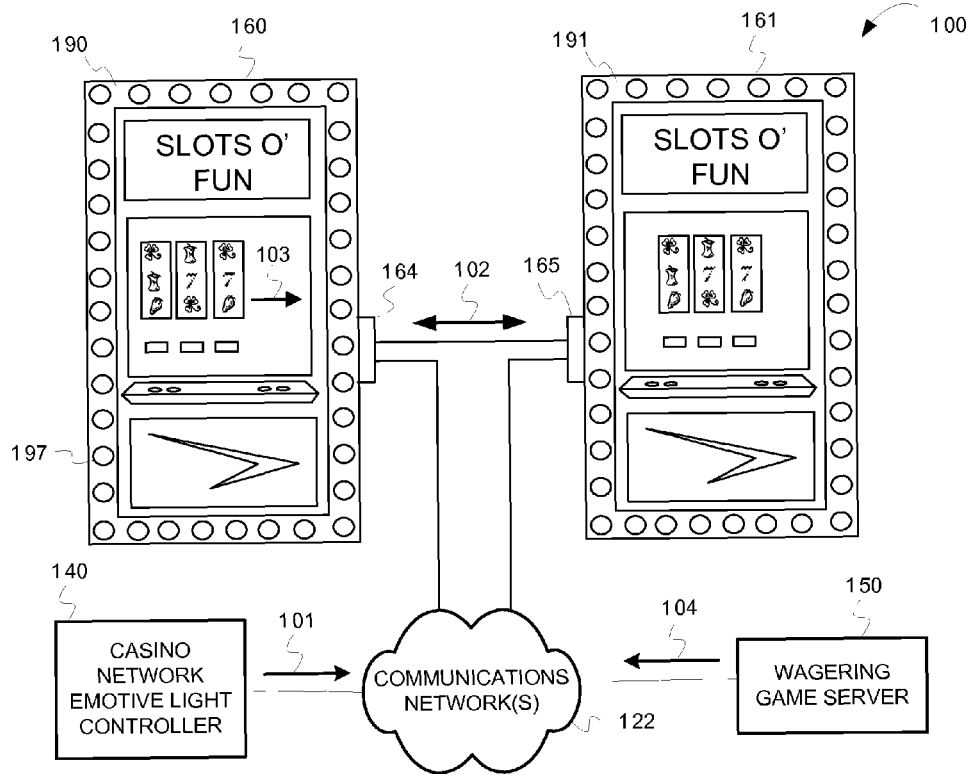
FIGS. 1A and 1B are illustrations of prioritizing multiple wagering game lighting content sources, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

INTRODUCTION

This section provides an introduction to some embodiments.

Many computerized wagering game systems (e.g., wagering game machines) have a variety of sound and graphical elements designed to attract and keep a game player's attention, such as sound effects, music, and animation. These game presentation features often include a variety of music, sound effects, and voices presented to complement a visual (e.g., video, computer animated, mechanical, etc.) presentation of the wagering game on a display. Often multiple sources of gaming content provide visual and sound content during a wagering game. Game developers face challenges controlling content from various sources. Some embodiments of the present subject matter, however, describe examples of controlling wagering game lighting content from multiple sources in a wagering game network (e.g., a casino network).

Embodiments can be presented over any type of communications network (e.g., public or private) that provides access to wagering games, such as a website (e.g., via wide-area-networks, or WANs), a private gaming network (e.g., local-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

Figure 1B:
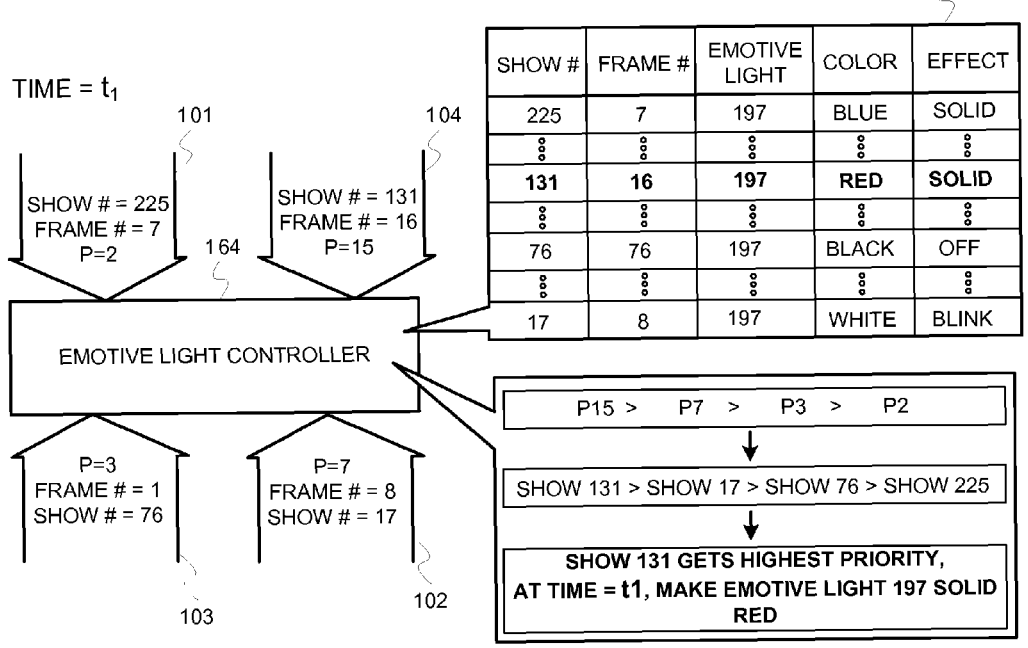

FIGS. 1A and 1B are conceptual diagrams that illustrate an example of prioritizing multiple wagering game lighting content sources, according to some embodiments. In FIG. 1A, a wagering game system ("system") 100 includes multiple wagering game machines (e.g., wagering game machines 160, 161). The wagering game machines 160, 161 are connected to communications network(s) 122. Also connected to the communications network(s) 122 are a wagering game server 150 and a casino network lighting controller (e.g., a casino network emotive light controller 140). The casino network emotive light controller 140 can be connected to the wagering game machines 160, 161 via a dedicated casino-wide lighting network (e.g., included in the communications network(s) 122), such as a DMX512 lighting network, which is dedicated to communicating theatrical lighting data at very high speeds with little or no data processing to interfere with the theatrical lighting data.

The wagering game machines 160, 161 can include light emitting devices, such as emotive lighting devices 190, 191, utilized to present lighting effects. The wagering game machines 160, 161 may be grouped together in a wagering-game-machine bank ("bank") and the wagering game machines 160, 161 can include communications devices that allow the wagering game machines 160, 161 to communicate with each other to present synchronized bank content, including bank level emotive lighting displays. For example, the wagering game machines 160, 161 can be connected via a dedicated, bank-level, peer-to-peer lighting network. The wagering game machines 160, 161 can be associated with the emotive light controllers 164, 165, which can receive emotive lighting communications from several sources. For instance, in one example, the emotive light controllers 164, 165 can receive one or more of the following:

- network emotive lighting show commands ("commands 101") (e.g., from the casino network emotive light controller 140, from a DMX light controller, etc.),
- bank emotive lighting show commands ("commands 102") (e.g., from a peer-to-peer bank controller, from a bank application, etc.),
- local application emotive lighting commands ("commands 103") (e.g., from applications on the wagering game machine 160), and
- server-side application emotive lighting commands ("commands 104") (e.g., from server-side games on the wagering game server 150).

The various commands (commands 101, 102, 103 and 104) may all simultaneously compete for use of the emotive lighting devices 190, 191. For instance, each of the commands 101, 102, 103 and 104 may include instructions for an emotive light device 197 (e.g., a single light emitting diode "LED," a group of LEDs, an LED bar, etc.) to present a conflicting color, intensity level, blinking pattern, or other light presentation effect at a given time (e.g., t1).

FIG. 1B illustrates an example of emotive light presentation data included in the commands 101, 102, 103 and 104. For example, the commands 101, 102, 103, and 104 can include information that identify a light show display, including a show identification number ("show number") and a frame number for the show number at the given time, t1. The show numbers can be stored as a byte of data (e.g., an 8-bit binary unit indicating one of 256 show numbers) or other amount of data sufficient to indicate a given number of available light shows. At time t1, the commands 101 include a show number of two-hundred twenty five ("show 225") and a frame number of seven ("frame 7"), meaning that the show number presented by the casino network emotive light server 140, at time t1, is currently transmitting frame number 7 of show 255. The other commands 102, 103, and 104 also include show numbers and frame numbers, for example, the commands 102 include values of show number 17 and frame number 8, the commands 103 include values of show number 76 and frame number 1, and the commands 104 include values of show number 131 and frame number 16. The commands 101, 102, 103 and 104 also include priority data, such as priority values that indicate a numerical indicator of one show's presentation importance relative to any other show's presentation importance. The system 100 can pre-configure the priority values according to an operator's desires for priority (see FIG. 4). The system 100 can assign the priority values to the show numbers, such as illustrated (e.g., show 225 has a priority value of 2, show 17 has a priority value of 7, show 76 has a priority value of 3, and show 131 has a priority value of 15). The system 100 can scale the priority values in ascending or descending order of value. For instance, in FIG. 1B, higher priority values indicate higher priorities. Each of the wagering game machines 160, 161, of FIGS. 1A and 1B, can be configured differently to process show numbers and frame numbers based on information such as locations of the wagering game machines 160, 161 within a casino, locations of the wagering game machines 160, 161 in relation to each other, player information for a player using the wagering game machines 160, 161, game information for games played on the wagering game machines 160, 161, a time of day, a maintenance schedule, or any other information that could relate to how and when to present light shows using the emotive lighting devices 190, 191.

Referring again to FIG. 1B, a configuration chart 110 includes data related to how the wagering game machine 160 controls its emotive lighting devices, specifically, the emotive light device 197. The emotive light controller 164 receives the commands 101, 102, 103, and 104 and orders their priorities according to their priority values (e.g., show 131>show 17>show 76>show 225). Show number 131 receives the highest priority for access to the emotive light device 197 because show number 131 has the highest priority value (P15), at time t1, than any other show numbers received at the wagering game machine 160. The emotive light controller 164 then consults the configuration chart 110 to determine a light control instruction for the emotive light device 197, for show 131 at frame 16. The configuration chart 110 indicates that the emotive light device 197 should be a solid red color. The emotive light controller 164 then causes the emotive light device 197 to be solid red at time t1. The system 100 can continuously receive updated emotive light presentation data and updated priorities to control the emotive lighting devices 190, 191 on the wagering game machines 160, 161.

FIGS. 1A and 1B, thus, present some embodiments of receiving emotive light presentation data from a variety of emotive light control sources, determining presentation priorities for the emotive light presentation data, and controlling the emotive light presentation data, from the variety of emotive light control sources, based on prioritization of the presentation priorities. Although FIGS. 1A and 1B describe some embodiments, the following sections describe many other features and embodiments. For example, in other embodiments, described further below, wagering game systems can control priorities based on locations of emotive lighting devices on a wagering game machine. In yet other embodiments, wagering game systems can assign priorities based on wagering game types and other classifications.

Example Operating Environments

This section describes example operating environments and networks and presents structural aspects of some embodiments. More specifically, this section includes discussion about wagering game system architectures.

Wagering Game System Architecture

Figure 2:
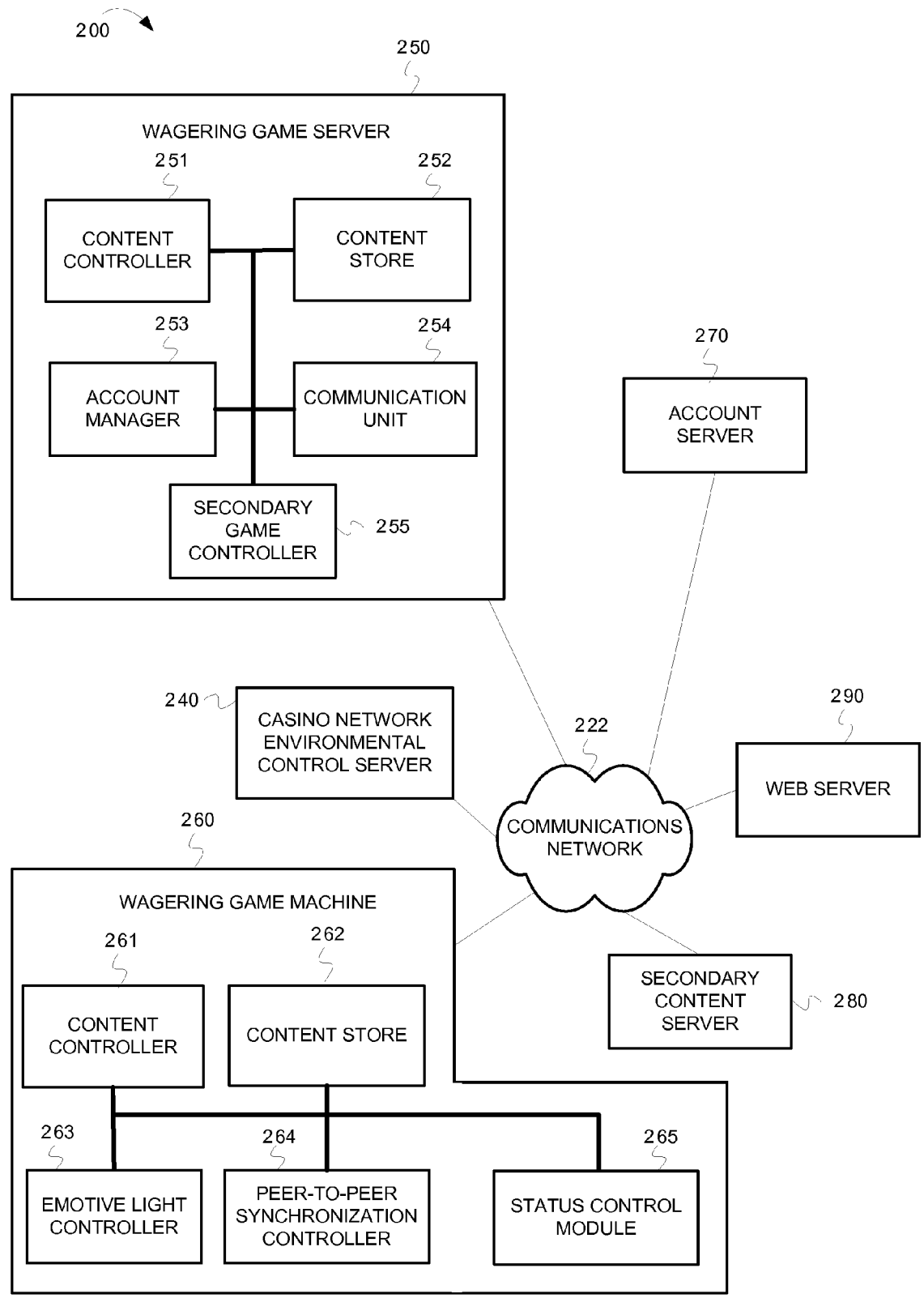
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store wagering game player account information, such as account settings, preferences, player profile data (e.g., name, avatar, etc.), and other information for a player's account (e.g., financial information, virtual assets, etc.). The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a secondary game controller 255 configured to control secondary game communications, content, and other information.

The wagering game system architecture 200 can also include the wagering game machine 260 configured to present wagering games and receive and transmit information to control wagering game effects. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include an emotive light controller 263 configured to control communications including emotive light presentation data. In some embodiments, the emotive light controller 263 can be external to the wagering game machine 260, such as attached to a cabinet associated with the wagering game machine 260. In other embodiments, the emotive light controller 263 can be detached from the wagering game machine 260 and can be a separate device that controls emotive lighting devices assigned to, proximate to, or in other ways associated with the wagering game machine 260. The wagering game machine 260 can also include a peer-to-peer synchronization controller 264 configured to control synchronization data between wagering game machines within a machine bank including synchronization of emotive light presentation data. The wagering game machine 260 can also include a status control module 265 configured to provide presentation status information to content control sources (e.g., wagering game servers, peer-to-peer content controllers, environmental control servers, emotive light controllers, etc.). The status information can provide information about events that affect the wagering game machine 260, or other devices or components associated with the wagering game machine 260. The events can indicate that presentation devices associated with the wagering game machine 260 are inactive, unavailable, or otherwise ineligible to receive content at a given time. The status control module 265, thus, can broadcast status information to all content controllers and other sources that need to know whether the wagering game machine 260, or presentation devices associated with the wagering game machine 260, are available to participate in a synchronized content presentation (e.g., a light show, a gaming effect, etc.).

The wagering game system architecture 200 can also include a casino network environmental control server 240 configured to control environmental light and sound presentation devices within a casino. The casino network environmental control server 240 can provide emotive lighting presentation data, including light presentation commands on emotive lighting devices on or near wagering game machines, as well as other devices within the casino such as spot lights, overhead emotive lighting, projectors, etc. The casino network environmental control server 240 may include a DMX512 (DMX) light controller, an AMX192 light controller, or other networked theatrical lighting controllers, servers, devices or systems. In some embodiments, the casino network environmental control server 240 can include, control, or in other ways be associated with casino network emotive lighting controllers, such as the casino network emotive light controller 140 in FIG. 1, the casino network emotive light controller 480 in FIG. 4, and the casino network emotive light controller 550 in FIG. 5.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. The secondary content server 280 can include one or more different servers or devices including a secondary game server (e.g., a bonus game server, etc.), a network game server (e.g., a progressive game server, a big event server), an advertising server, a community game server, etc. The secondary content server 280 can provide and control content for community games, including networked games, social games, competitive games, or any other game that multiple players can participate in at the same time.

The wagering game system architecture 200 can also include a web server 290 configured to control and present an online website that hosts wagering games. The web server 290 can also be configured to present multiple wagering game applications on the wagering game machine 260 via a wagering game website, or other gaming-type venue accessible via the Internet. The web server 290 can host an online wagering website and social network. The web server 290 can include other devices, servers, mechanisms, etc., that provide functionality (e.g., controls, web pages, applications, etc.) that web users can use to connect to a social network and/or website and utilize social network and website features (e.g., communications mechanisms, applications, etc.).

Each component shown in the wagering game system architecture 200 is shown as a separate and distinct element connected via a communications network 222. However, some functions performed by one component could be performed by other components. For example, the wagering game server 250 can also be configured to perform functions of the emotive light controller 263, the peer-to-peer synchronization controller 264, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machine (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machine can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
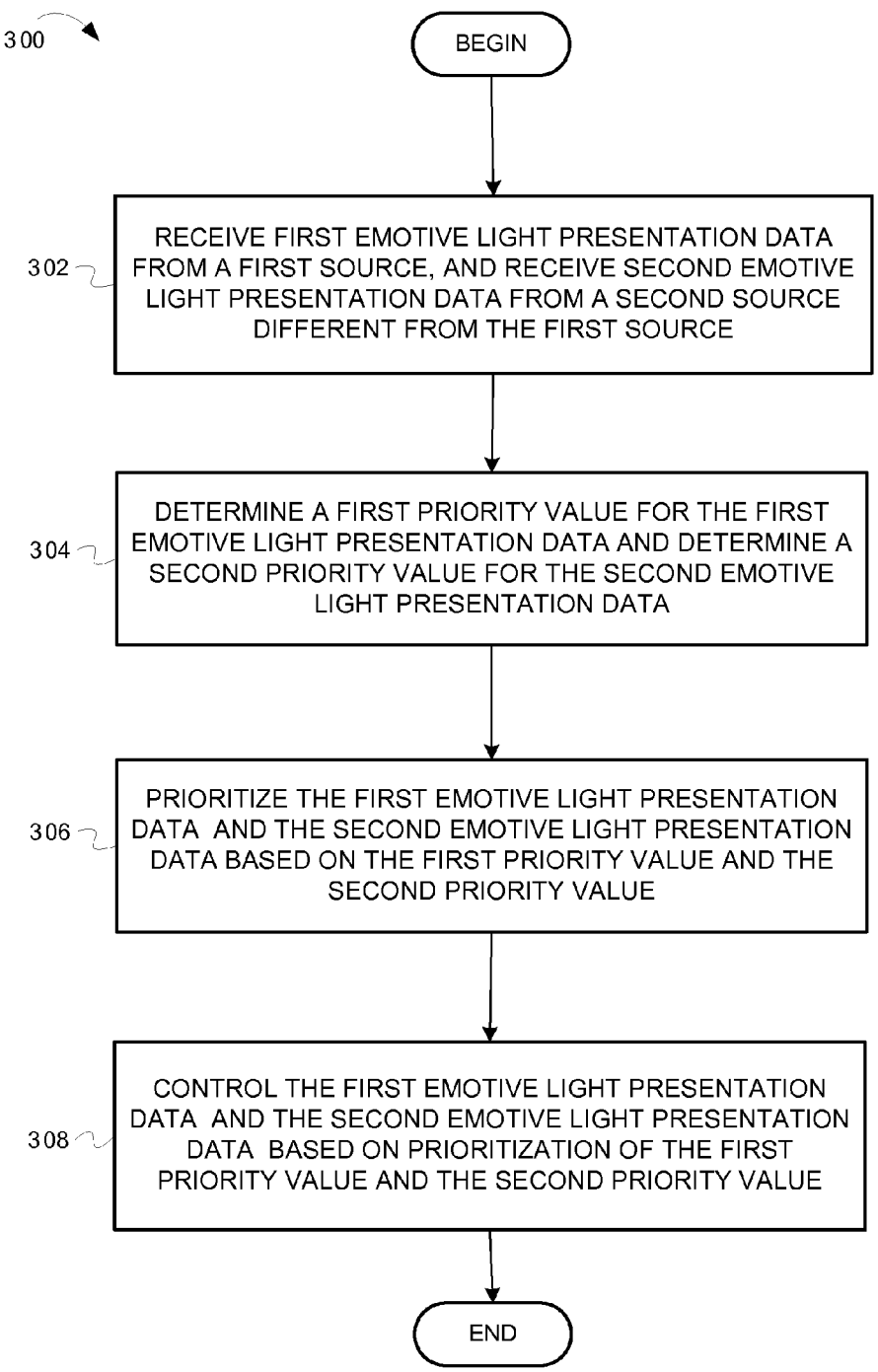
FIG. 3 is a flow diagram 300 illustrating prioritizing multiple wagering game lighting content sources, according to some embodiments.
Figure 4:
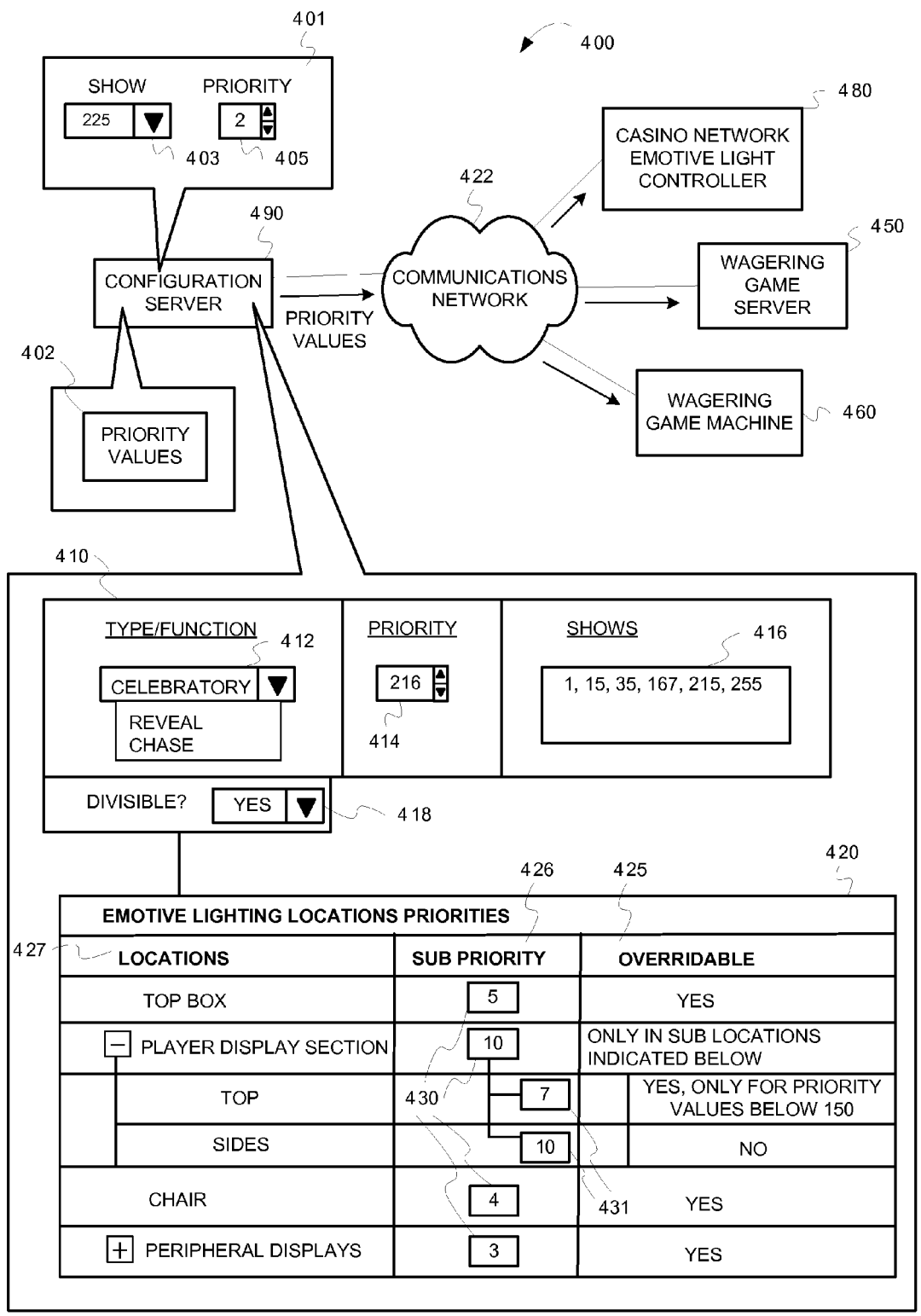
FIG. 4 is an illustration of configuring lighting priority values for wagering game types, according to some embodiments.
Figure 5:
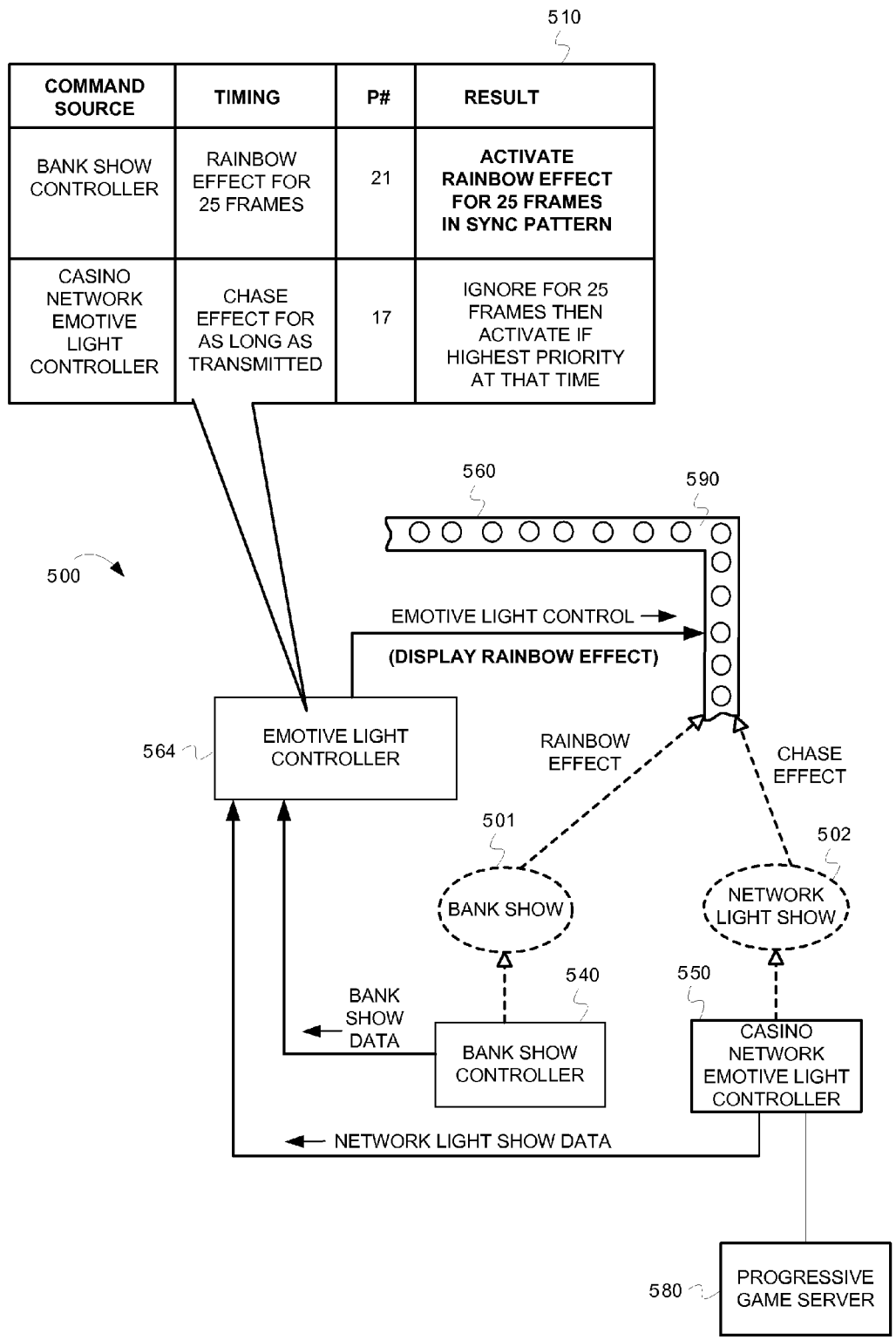
FIG. 5 is an illustration of prioritizing casino network lighting commands and peer-to-peer bank lighting commands, according to some embodiments.
Figure 6:
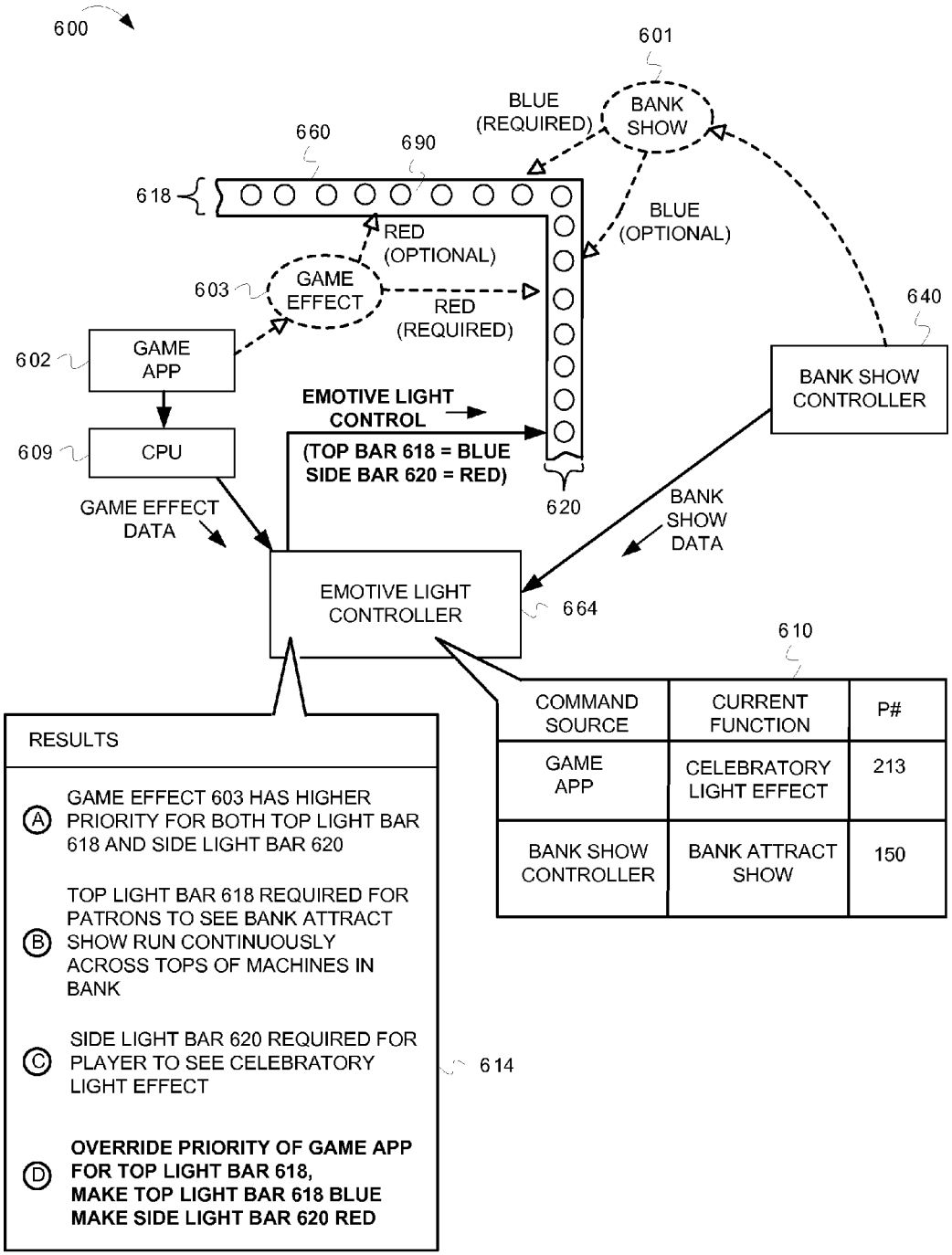
FIG. 6 is an illustration of prioritizing application lighting commands and peer-to-peer bank lighting commands, according to some embodiments.

FIG. 3 is a flow diagram ("flow") 300 illustrating prioritizing multiple wagering game lighting content sources, according to some embodiments. FIGS. 4, 5, and 6 are conceptual diagrams that help illustrate the flow of FIG. 3, according to some embodiments. This description will present FIG. 3 in concert with FIGS. 4, 5 and 6. In FIG. 3, the flow 300 begins at processing block 302, where a wagering game system ("system") receives first emotive light presentation data from a first source, and receives second emotive light presentation data from a second source different from the first source. In some embodiments, the light presentation data (from first source or second source) can include a command to direct an emotive lighting device to present light information. Light information can include color, brightness, sequences, timing, etc. related to a light show or light related presentation. The emotive lighting device can have one or more lights associated with it, including a single light, a string of lights, an orientation of lights, a light bar, a light display, a section of lights, etc. Examples of emotive lighting devices can include light emitting display (LED) bars attached to a wagering game machine cabinet, lights on a cabinet top-box, marquee lights, chair lighting, insulator lighting, reel illuminator lights, button bezels, etc. Other examples can include LED panels, spotlights, overhead lighting, etc. Thus, emotive lighting devices can include any lighting device that is used in conjunction with a light effect (e.g. a programmed light presentation, a light show, a celebratory effect, etc). The light effect may be specifically designed to evoke an emotional response in a casino patron, such as interest, excitement, etc. However, the actual lighting devices used in conjunction with a lighting effect can be any lighting device that produces viewable light that can be seen by a casino patron. Thus, some embodiments may also, or instead, refer to "light emitting" devices, "light effect" devices, "light presentation" devices, or "lighting" devices and may refer, interchangeably, to "emotive lighting" devices. Emotive lighting devices, in some embodiments, may also be networked to function in a coordinated manner to present a synchronized lighting effect or lighting presentation. In some embodiments, the system can communicate emotive lighting data between the first source and second source using different protocols and/or network types. For example, in some embodiments, the system can communicate emotive lighting data between wagering games and components of a wagering game machine (e.g., a central processing unit "CPU", an emotive light controller "ELC", and emotive lighting device, etc.) via a Universal Serial Bus (USB) connection. In some embodiments, the system can communicate emotive lighting data in a bank via a peer-to-peer communication network (e.g., Emotive Lighting Synchronization Network, or EL Sync). In some embodiments, the system can communicate emotive lighting data between network lighting controllers and wagering game machines via a DMX network. In some embodiments, exemplary sources of emotive lighting data can include (1) a wagering game on a wagering game machine, (2) a neighboring wagering game machine as part of a synchronized peer-to-peer emotive lighting network within a machine bank, (3) a casino level lighting network (e.g., DMX controller), and (4) other localized and network sources vying for use of emotive light devices on a wagering game machine such as a centralized controller or server that provides secondary wagering games. In some embodiments the secondary games can communicate directly with an emotive light controller (ELC) associated with a wagering game machine or with primary wagering games on the wagering game machine via an environmental lighting controller (e.g., DMX controller). For instance, the secondary KENO game can send an emotive lighting command to the centralized server that the KENO game is about to begin. The centralized server can send the emotive lighting command to the ELC to start a chase light show on the wagering game machine (or bank of machines). The secondary wagering game source can send the emotive lighting command directly to ELC to create the lighting effect. Thus, server side games can load their own light shows directly to a wagering game machine, through the ELC. DMX controllers can communicate directly with an ELC or group of ELCs. In some embodiments, the EL Sync can broadcast emotive lighting commands and each wagering game machine is programmed to react to the emotive lighting commands individually. On the EL Sync, one wagering game machine, or controller associated with a wagering game machine (e.g., a wagering game, an emotive light controller, etc.) can be the master controller for timing purposes during the synchronization of a coordinated bank lighting effect. A master controller for a bank ("bank controller") can send, or pass, timing to wagering games to control timing and execution of commands. Also, a DMX controller, an ELC, etc., can send or pass DMX commands to wagering games to further improve timing, parsing, processing, etc. of the DMX commands.

In some embodiments, the emotive light presentation data can control effects and/or light shows that relate to wagering game activities that occur on wagering game machines, across banks of machines, and across a casino network. Emotive light presentation data can be related to wagering game lighting effects, wagering game attract shows, betting or game results activity, celebratory effects, network game reveals, network game activity, tournament activity, game downloads, etc. In some embodiments, the emotive light presentation data can be related to wagering game effects. The following is a list of some example wagering game effects the system can activate according to some embodiments:

Light intensity effect. The system (e.g., a wagering game application, a wagering game server, a marketing server, etc.) can award a variable number of wagering game free spins or bonus picks in a bonus. The system can activate emotive lighting that lights a specified color and then increases or decreases the color intensity each time a spin or pick is made.

Color stepping effect. The system can award a variable number of wagering game free spins or bonus picks in a bonus. The system can activate emotive lighting that lights a specified color and then steps through colors each time a spin or pick is made.

Color assigning. The system can present a game with a bonus where the player can pick a character to play with. A characteristic for the character may be a certain color (e.g., the character has a yellow car) or be of a certain type (e.g., the character's car is a sports car). The system can light emotive lighting to match the color (e.g., make the emotive lighting yellow to match the car's color) or have a distinctive light presentation pattern (e.g., make the emotive lighting circle the wagering game machine fast to match the sports car's speed type). In some embodiments, the bonus game can be a community gaming events, where players on a bank of machines join in the community bonus game, each with a different character. The different characters can have different colors. The system can communicate with all the wagering game machines in the bank (e.g., via peer-to-peer communication), and light the emotive lighting on each machine to match the character's color.

Look up effect. The system presents a wagering game on a main display that awards a bonus where the player has to look up at a secondary display above the main display. The system can light emotive lights on the sides of the main display, presenting a colored light wave that pulses upward, drawing the player's eyes upward toward the secondary display.

Money accepted effect. The system can present emotive lighting with a gold and green color whenever money or a ticket-in-ticket-out (TITO) ticket is accepted into the wagering game machine's cash collector.

Cash out effect. The system presents a light show in conjunction with a cash out procedure.

Thermometer effect. The system presents a game that has a bonus or progressive that is guaranteed to go off at a certain time or amount. The system presents emotive lighting having a thermometer color index starting at cool blue and changing during active play to yellow, then to orange, and finally to red to accentuate that the game is ready to trigger a bonus or a progressive. The system can also determine that the guaranteed offering is through a side bet or max bet and present the thermometer effect accordingly.

Win line accentuating. The system can present wagering games with colored pay lines. The system can determine pay lines that have won and present emotive lighting that pulses the same color as the colors of the winning pay lines during the payout cycle. The system can pulse the colors of the winning pay lines on the emotive lighting as the system cycles a presentation the winning pay line presentation.

Win size. The system can present a colored lighting effect on the emotive lighting based on the size of a win (e.g., a jackpot win, a progressive win, etc). For example if player has a win over 30× total bet the system can present a Red-Green-Blue (RGB) color pulse effect. If, however, player has win over 100× total bet the system can present a gold color pulse effect. If a progressive game has color coding (e.g., different colors for different progressive game levels), the system can present emotive colors for wins that fall within the progressive levels.

Chase lights. In some embodiments, the system can present a "chase" light effects that include a light cluster that chases another light cluster around a wagering game machine, or around a bank of wagering game machines, for various wagering game purposes (e.g., as an attract show, as a game celebration, as specific game play elements, etc.).

In some embodiments, the emotive light presentation data can be related to bank effects. The following is a list of some example bank effects the system can activate according to some embodiments:

Hot seat effect. The system can determine wagering games, within a bank of wagering game machines, which have made an eligibility bet for a specific gaming purpose. For instance, the system can initiate a bonus gaming event for which one of many eligible machines in the bank can participate. When the bonus is initiated, the system can light emotive lighting on all eligible wagering game machines. The system can light the emotive lighting initially with a specified color, then one at a time, each eligible machine within the bank changes its emotive light to a specified secondary color to create a chase light effect across or around the bank of machines. The system controls the chase light effect to give the feel of a fast chase cycle that slows down to eventually stop on a chosen as the "hot seat," or in other words, the machine that will be awarded the bonus. The hot seat can pulse the secondary color until the bonus starts. In some embodiments, the effect can be synchronized with an animation on the base games or on wagering game machine signage. In some embodiments, different elements of the hot seat effect can be controlled by individual games running on the eligible wagering game machines.

Bank attracts. Bank "attracts" (short for attraction shows) are shows presented across a bank of machines. Bank attracts are more attractive from a distance because they use a grouping of wagering game machines to attract players to the machines in the bank. One example bank attract effect can be an attract rainbow effect. The system can generate a fading chase light effect that cycles through the Red-Green-Blue (RGB) color schemes. In some embodiments, the system can exclude the attract rainbow effect from a wagering game machine within the bank that may be ineligible for the bank attract (e.g., a wagering game machine that has credits on a game).

Span effect. The system can generate a span of lighting across a subset of adjacent wagering game machines within a bank. The adjacent wagering game machines may be grouped for cooperative play.

In some embodiments, the system can leave out, or skip, one or more content presentation devices ("presentation devices") from a bank-wide game effect because the presentation devices may be inactive, ineligible, unavailable, etc. for the bank-wide game effect (e.g., a bonus game, a reward, an attract, etc.). In some embodiments, the bank-wide game effect can be a multi-media presentation, including light, sounds, etc. The presentation devices may include wagering game machine displays, reels, emotive lighting devices, speakers, peripheral displays, etc. associated with the bank of wagering game machines. Each presentation device can have an identity (e.g., network address). The presentation devices can be configured to respond to content control data (e.g., lighting commands, sound commands, etc.) based on various factors (e.g., types of content presentation devices in a bank, current states of content presentation devices, etc.). The system can utilize the unique addresses to send different content control data, or no content control data, to inactive or ineligible presentation devices so that the content presentation devices are skipped, or left out, of the bank-wide game effect. Even though the system can leave a content presentation device out of a bank-wide game effect, the system can still monitor gaming activity and continuously evaluate whether presentation devices may become eligible or active. The system can then immediately incorporate the eligible or active presentation devices into the bank-wide game effect.

In one example, a game effect controller, (e.g., a bank light show controller, a peer-to-peer light controller, a wagering game application, a server-side application on wagering game server, etc.) can perform a bank effect, such as a span lighting effect ("span effect"), or some other type of gaming effect. The game effect controller can present the bank effect continuously across a bank of presentation devices associated with one, or more, wagering game machines (e.g., a bank of wagering game machines). The presentation devices, associated with the bank of wagering game machines, however, may be experiencing events that have, or can be categorized as a having, higher priorities than the priority for the bank effect. The game effect controller that controls the bank effect can receive presentation status information from all of the presentation devices within the bank (e.g., via queries to, or broadcasts from, presentation devices and/or presentation device controllers within the bank, via queries to, or broadcasts from, lighting content sources that send lighting data to the presentation devices, etc.). The presentation status information can indicate one or more events that affect a state of availability, of each of the presentation devices, to present at least some portion, or accompanying portion, of the bank effect. Using the presentation status information, the game effect controller determines which of the presentation devices may be receiving content presentation commands (e.g., lighting commands) or that are presenting content (e.g., lighting content) that is higher in priority, or importance, than the priority or importance of the bank effect. For instance, the presentation status information can include lighting data received at emotive light controllers for a bank of wagering game machines. The lighting data can include priority values for light show numbers. The game effect controller can compare the priority values for the light show numbers with a priority value for the bank effect. The game effect controller can then use the comparison data to determine which of the presentation devices in the bank are receiving higher priority content presentation commands, or are associated with other presentation devices that have higher presentation priorities, and are, thus, ineligible to activate the bank effect.

Further, the game effect controller can ascertain network addresses for ineligible presentation devices and generate a synchronized bank effect that skips the addresses of ineligible presentation devices. For example, the game effect controller can send the bank effect data to only eligible devices. In some examples, the bank effect can have a distinct content element that is presented at some portion, or during some time interval, of the bank effect. The distinct content element can be a visually distinct lighting element (e.g., a specific light pattern, a distinct color combination, a unique LED image, etc.) included in the presentation of the bank effect. For instance, a bank effect may include a lighting effect that looks like a snake, with a very long body and a head. The head of the snake may be a visually distinct lighting element from the body of the snake (i.e., the body of the snake can span across multiple emotive lighting devices and may look visually monotonous, but the head has a visually unique look that sets it apart from the body). The game effect controller can determine whether the visually distinct lighting element could potentially be left out of the bank effect if it were to send lighting data to an ineligible lighting device that would not present the lighting data when received (e.g., if the snake effect were sent to an ineligible emotive lighting device, the head of the snake may disappear from view because the ineligible emotive lighting device would be unavailable to present the snake effect). In some embodiments, the visually distinct lighting element may only be an interesting, notable, or unique part of a bank lighting effect. The bank lighting effect, thus, would only suffer aesthetically from omission of the visually distinct lighting element. In other embodiments, however, the visually distinct lighting element may be critical, necessary, revelatory, outcome determinate, or in some other way, convey an important purpose, or function, of the bank effect (e.g., the head of the snake stops at a wagering game machine, which indicates the winner of a community wagering game). In other words, the distinct content element reveals a gaming outcome, and, according to presentation rules for the gaming outcome, the distinct content element is required to be presented at all times during the bank gaming effect. In such as case, omission of the visually distinct lighting element would not only have an aesthetic consequence, but may actually defeat the purpose of presenting the bank effect if it were to be omitted. As a result, the game effect controller can ensure that ineligible presentation devices are omitted, or excluded, from participating as nodes in the bank lighting effect. For instance, the game effect controller can exclude the ineligible presentation devices from receiving transmissions of the bank lighting effect. For instance, the game effect controller can generate a transmission schedule that would entirely omit transmission of lighting data to ineligible presentation devices. The transmission schedule can be a control matrix that synchronizes the timing of transmissions of emotive lighting control data. In other words, the game effect controller can generate a transmission schedule that sends emotive lighting control transmission to only eligible presentation devices, treating the ineligible presentation devices as if they were non-existent. The game effect controller thus synchronizing the bank effect so that it does not omit the presentation of the visually distinct lighting element (e.g., does not omit the presentation of the snake's head). The game effect controller thus ensures a continuous, synchronized light effect pattern between only the eligible, participating nodes (e.g., eligible presentation devices) that would not omit the visually distinct content element from the synchronized bank effect for any period of time.

In some embodiments, as stated previously, the ineligible presentation devices may be ineligible because control data received at those presentation devices has higher priorities than the priority for the bank effect. However, other events, other than those that produce emotive lighting effects, can also provide priorities that would make the presentation device ineligible. The other events can include gaming events, maintenance events, marketing events, sound events, etc., that may not necessarily use emotive lighting devices associated with a wagering game machine, but may have priorities for the events that would trump the presentation of some, or all, emotive lighting. For example, a wagering game machine may present an advertisement on a wagering game machine display. The advertisement may have a high priority that prevents, or warrants the prevention of, some or all emotive lighting presentations that would distract from the advertisement's presentation. Thus, the presentation status information that the game effect controller receives from a presentation device in the bank can include game activity data, maintenance activity data, marketing activity data, sound data, etc. The game effect controller, thus, can manage priorities for all types of data and can determine subsets of presentation devices, within a bank, that are ineligible for a bank effect and can exclude the ineligible presentation devices from the bank effect. The game effect controller can also determine subsets of eligible presentation devices and include the eligible presentation devices in the bank effect.

In another example, some other events may accompany emotive lighting events, but may have priorities that make emotive lighting devices ineligible even if the emotive lighting devices are available to present the bank effect. For example, the game effect controller can evaluate sound effects that accompany the bank effect and determine whether the sounds effects are audibly distinct. For example, the bank effect can include sound effects that accompany an emotive lighting effect. The sound effects may be audibly distinct during a portion of the emotive lighting effect. For instance, a portion of the emotive lighting effect may not be visually distinct but the sound produced by an associated speaker, for example, for that portion of the emotive lighting effect, may be audibly distinct from other sound effects that accompany the emotive lighting effect. For example, an emotive light show may include audibly distinct sound elements that beep at given intervals on speakers within a bank of wagering game machines. Thus, if a speaker, or other sound production device, associated with an emotive lighting device, is unavailable to present the audibly distinct sound element, the game effect controller could exclude the emotive lighting device from receiving lighting data for the bank effect because the accompanying audio device is unavailable. Thus, even though the emotive lighting device associated with the speaker is eligible to present lighting content, the distinct content element is associated with the speakers, which are unavailable, and, thus, the game effect controller treats the emotive lighting device as ineligible.

Further, still referring to excluding ineligible presentation devices, in some embodiments, the system can send bank effect control data to ineligible presentation devices as well as to eligible presentation devices. The system can include exclusionary instructions in the bank effect control data. A content controller for an ineligible presentation device can evaluate the exclusionary instructions and determine to skip presentation of the bank effect based on the exclusionary instructions. For instance, the exclusionary instructions can include a priority value for the bank effect. The content controller for the ineligible device can receive the priority value, included in the bank effect control data, and determine whether the priority value for the bank effect control data is higher than a priority values for other game effect data (e.g., see processing block 306) also received by the content controller. If the other game effect data has a higher priority value, the content controller can present the higher priority data first, and ignore, or suspend, the presentation of the bank effect control data. In other embodiments, the system can include "pass" instructions in the exclusionary instructions. The pass instructions can instruct the content controller to ignore the bank effect control data, or pass presentation of the bank effect to a neighboring presentation node (e.g., a neighboring eligible presentation device in the bank of presentation devices). After time, the ineligible presentation device may become eligible (e.g., once a higher priority, game effect command completes its presentation on the ineligible presentation device). The content controller can, therefore, immediately begin presenting the bank effect on the presentation device because the content controller is already receiving the bank effect control data. Thus, in some embodiments, the content controller does not have to wait for the game effect controller to re-evaluate the availability of the presentation device or wait for the game effect control to begin sending bank effect control data because the content controller has been receiving the bank effect control data all along.

In some embodiments, the emotive light presentation data can be related to network lighting effects. The following is a list of some example purposes for which the system can activate network lighting effects according to some embodiments: complimentary awards, community games, secondary games, maintenance, casino-wide progressive games, network celebrations, network reveals, mystery reveals, casino-wide events, etc.

The flow 300 continues at processing block 304, where the system determines a first priority value for the first emotive light presentation data and determines a second priority value for the second emotive light presentation data. In some embodiments, the priority values (first priority value or second priority value) can be a bit in a command, an instruction, a parameter, etc., included in emotive light presentation data. In some embodiments, the system can provide configuration tools for an operator to indicate or assign priority values for different shows, different activities, etc. The system can store configured priority rules and make the priority rules accessible to all wagering game machines and their ELCs.

FIG. 4 illustrates an example of a wagering game configuration system ("system") 400 including a configuration server 490 connected, via a communications network 422, to a casino network emotive light controller 480, a wagering game server 450, and a wagering game machine 460. The configuration server 490 can generate priority values 402 for emotive lighting presentation data for a variety of conditions and situations. For instance, the configuration server 490 can present a first configuration user interface ("first interface") 401 through which a user can select show numbers from a show number selection control 403 and assign priorities number values to the show number values using a priority value assignment control 405. The configuration server 490 can store the selected priority number values as associate them with selected show numbers within the priority values 402 (e.g., a file, a database, etc.). The system 400 can then make the priority values 402 available to the casino network emotive lighting controller 480, the wagering game server 450, and the wagering game machine 460 via the communications network 422. Further, the system 400 can present a second configuration user interface ("second interface") 410, with advanced configuration features. For instance, the second interface 410 can include a type selection control 412 for a user to select activity types, functional requirement types, device types, event types, etc. (e.g., types of wagering game activity, types of light show types, etc.). The second interface 410 can also include a priority value assignment control 414, which assigns a priority to the selected type in the type selection control 412. The second interface 410 can present a show number list 416 that indicates the show numbers that meet the type, criteria, or other value within the type selection control 412. In some embodiments, some show numbers may fall into more than one category or type. The second interface 410 can present show numbers that may be assigned different priority values and present options to further customize the priority value for the show number.

In some embodiments, the configuration server 490 can also present functionality for user to assign priorities to sub-levels, or sub-classifications, of types, shows, etc. In one embodiment, for example, the second interface 410 can present a divisible selector 418 that permits further priority value configuration for different locations on a wagering game machine and accompanying peripheral devices. The configuration server 490 can present an emotive lighting location priority interface ("location interface") 420. The location interface 420 can include a location section 427 that specifies a location of emotive lighting devices on a wagering game machine. The location interface 420 can also include a sub-priority section 426 that includes first-level sub-priority selectors 430 for each of the locations listed for the location section 427 and second-level sub-priority selectors 431 for the first-level priority selectors 430. The first level sub-priority selectors 430 and second level sub-priority selectors 431 can indicate relative priorities for the location based on the type indicated in the type selection control 412. The location interface 420 can also include an instructions section 425 for indicating customized instructions, such as whether the location can be overridden by lower priority commands. For example, the "top-box" location has a priority value of "2" and is capable of being overridden for use by other lighting commands that may have a lower priority than that indicated in the priority value assignment control 414.

FIG. 6 below illustrates an example of overriding priorities which indicates an example of a lower priority bank attract effect overriding a higher priority application celebratory show but only for a specific location of the wagering game machine. In other words, the celebratory show, which would normally have access to emotive lights on the top and the sides of a wagering game machine cabinet based on its higher priority, can be overridden for the top emotive lights by the bank attract effect because the top lights are less effective for presenting the application's celebratory show. Because the top lights are less effective the bank attract effect is given access to the top lights while the celebratory effect is given access to the side lights.

Returning to FIG. 4, the location interface 420 can specify sub-priorities values that a wagering game system ("system") 600 in FIG. 6, for example, can refer to when determining whether to override priorities based on location.

Returning to FIG. 3, in some embodiments, if emotive light presentation data does not have a priority value, the system can dynamically assign a priority value based on distinct, ascertainable information from the application, the player, the light show, the environment, or events that occur on the system. Examples of distinct, ascertainable information may include, but are not limited to, information from the following: the emotive light presentation data, an associated game, a player, a game manufacturer, a time of day, a type of gaming application, a type of gaming event, a type of technology involved in the gaming application, a manufacturer of a gaming application, a marketing status for a gaming application, an application specification, a subject matter of a gaming application, a game genre for a gaming application, a player preference for a gaming application, player history associated with a gaming application, etc. In some embodiments, the system may assign priority values based on activity types or priority assignation rules. For instance, the system can determine activities that may have revenue generating capabilities (e.g., attracts of new or interesting games, activation of games by players, downloads of requested wagering game data, etc.). The system could, for example, assign the revenue generating activity the highest priorities. In other embodiments, the system may determine game activities that are more significant than others. The system, for instance, may determine that presenting game reveals, or outcomes, has the highest priority over other game activities. Other activities may include community game activities, maintenance activities, mystery reveals, network attracts, bank attracts, game attracts, etc. For example, the system could determine that a local game attract could have a lower priority than a bank attract. The system can use the priority assignation rules for assigning priorities (e.g., the rules may indicate principles, or parameters, for priority assignation such as (1) game outcomes are greater than other revenue generating activity, (2) all revenue generating activity is greater than celebrations, (3) all community game activity is greater than attracts, (4) bank attracts are greater than game attracts, etc.).

The flow 300 continues at processing block 306, where the system prioritizes the first emotive light presentation data and the second emotive light presentation data based on the first priority value and the second priority value. In some embodiments, the system can determine priorities that simultaneously conflict with light presentation on the emotive lighting device. The system can prioritize the conflicts by determining which priority value is more significant, or that transcends other values according to a priority order (e.g., which priority value is higher in value for an ordering scheme where higher priority value numbers indicate priorities that are more significant).

The flow 300 continues at processing block 308, where the system controls the first emotive light presentation data and the second emotive light presentation data based on prioritization of the first priority value and the second priority value. For example, the system can stop, pause, kill, or ignore lower priority commands in favor of higher priority commands. For example, the system may ignore lower priority lighting commands sent via one source (e.g., a DMX controller) in favor of higher priority lighting commands sent by another source (e.g., a bank controller, a wagering game server, a wagering game machine application, etc.). In some embodiments, the system can coordinate the proper timing for handing off use of an emotive lighting device at the end of one higher priority command and activate the emotive lighting device for next highest priority.

For instance, in FIG. 5, a wagering game system ("system") 500 can include a casino network emotive lighting controller 550 and a bank show controller 540 (e.g., an application on a bank of wagering game machines) connected to a wagering game machine 560. The casino network emotive lighting controller 550 can be a DMX controller connected via a DMX network, which can connect directly to an emotive light controller 564 for the wagering game machine 560. The casino network emotive lighting controller 550 can be connected to wagering game servers, such as a progressive game server 580, which provides instructions to begin light shows for casino-wide content (e.g., for a progressive game for which multiple wagering game machines can be eligible across a casino). The bank show controller 540 can be connected via an EL Sync network connection, which can also connect directly to the emotive light controller 564. The emotive light controller 564 can control emotive lighting devices 590 associated with (e.g., surrounding) the wagering game machine 560. The bank show controller 540 can send lighting commands for a bank show 501 while the casino network emotive lighting controller 550 sends lighting commands for a network light show 502. The emotive light controller 564 can track the lighting commands in an emotive lighting data chart 510 including tracking the sources of the lighting commands and priority values (e.g., the bank show commands include a priority value of "21" and the DMX show commands include a priority value of "17"). The bank show 501 may include performing an EL Sync rainbow effect on emotive lighting devices 590 for the wagering game machine 560 for twenty-five frame counts. The emotive light controller 564 can determine that the priority value for the bank show 501 is higher than the priority value for the network light show 502. The emotive light controller 564 can ignore lighting commands for the network light show 502 during the twenty-five frame counts. During the 25 frame counts, however, the emotive light controller 564 can monitor the priority value of the network light show 502 to determine if it changes to a higher value. When the 25 frame counts end, or are about to end, the emotive light controller 564 can check for other lighting commands delivered to the wagering game machine 560, to determine if other lighting commands may have arrived that have a higher priority than the network light show 502. If, however, after the 25 frame count, there are no other commands with higher priorities, then the emotive light controller 564 can immediately implement the DMX commands (e.g., implement the chase effect on the emotive lighting devices 590). In some embodiments, the emotive light controller 564 can look at frame numbers and time stamps of when the next highest priority show (e.g., the chase effect) originally requested to begin (e.g., when the casino network emotive light controller 550 began playing the chase effect), then calculate a current frame for which to start playing the next highest priority light show as soon as the highest priority show (e.g., the rainbow attract) stops playing. Thus, the emotive light controller 564 can synchronize presentations on the emotive lighting devices 590 to begin immediately playing the next highest priority light show at the proper frame. Further, although FIG. 5 illustrates that a bank show controller 540 was given higher priority than the casino network emotive light controller 550. In other embodiments, the casino network emotive light controller 550 or other light data source (e.g., an application, a gaming server, etc.) may have higher priority to start out with.

Returning to FIG. 3, in some embodiments, the system can determine locations of emotive lighting devices on a wagering game machine and divide or override priority commands based on the locations. For example, the system can determine to implement a lower priority command to utilize a lesser important emotive lighting device if a higher priority command can have access to other more important emotive lighting devices that are important to the function for the higher priority command. FIG. 6 illustrates an example. In FIG. 6, a wagering game system ("system") 600, includes a wagering game machine 660 connected to a bank show controller 640. The bank show controller 640 can connect to an emotive light controller 664 associated with the wagering game machine 660. The bank show controller 640 can connect to the emotive light controller 664 (e.g., via an EL Sync network connection, via a DMX network connection, etc.). The emotive light controller 664 can also communicate with a wagering game application ("game") 602 on the wagering game machine 660 (e.g., via a central processing unit (CPU) 609 connected through a bus (e.g., USB)). The wagering game machine 660 includes emotive lighting devices 690 associated with (e.g., surrounding) the wagering game machine 660. The emotive light controller 664 can control the emotive lighting devices 690. The bank show controller 640 runs a bank attract show (bank show 601) configured to utilize both a top emotive light bar 618 and a side emotive light bar 620 on the wagering game machine 660 (e.g., the bank show controller 640 wants to color both the top emotive light bar 618 and the side emotive light bar 620 the color blue). At the same time, however, the game 602 may run a game effect 603 that is configured to also utilize both the top emotive light bar 618 and the side emotive light bar 620 on the wagering game machine 660 (e.g., the game effect 603 wants to color both the top emotive light bar 618 and the side emotive light bar 620 the color red). The bank show controller 640 and the game 602, therefore, provide conflicting lighting commands for the same emotive lighting devices 690. The emotive light controller 664, for the wagering game machine 660, can receive lighting commands from the bank show controller 640 and the game 602 and can consult priority values included in the lighting commands. In some embodiments, the priority values may be different or the same. The emotive light controller 664 can track priorities in a priority chart 610, which indicates that the game effect 603 has a higher priority than the bank show 601. The emotive light controller 664, however, can be configured to arbitrate the priorities so that portions of the game effect 603 and the bank show 601 can run on different parts, or locations, of the wagering game machine 660. For instance, the emotive light controller 664 can decide to bypass some priority values, in certain situations, based on "priority splitting" principles or rules. Priority splitting rules, for example, can balance benefits for the current player playing the game 602 against needs of attracting nearby players to a bank. As an example, the purpose of an attract show is to attract potential players from a distance. For attracting players from a distance, the top emotive light bar 618 may be the most important emotive lighting device because distant patrons may have a better view of top lights (i.e., not obscured by game chairs, current players, etc.). Therefore, the emotive light controller 664 can determine that the position of the top emotive light bar 618 is positioned to effectively convey the purpose, or function, of the attract show by being the most prominently positioned device that can be seen by distant casino patrons. At the same time, however, the emotive light controller 664 can determine that the position of the side emotive light bar 620 is positioned to effectively convey the purpose, or function, of the game 602 by being the most prominently positioned device that can be seen by the player that plays the game 602. Side lighting may be more beneficial for presenting game content than a top lighting because players can more readily see lighting in their periphery then above or below them. In one embodiment, the emotive light controller 664 can use minimal locality presentation requirements indicated in lighting instructions and/or accessed from configuration files, settings, or other storage locations. The minimal locality presentation requirements can indicate that the side emotive light bar 620 can present at least a part of an emotive lighting presentation that complies with locality presentation requirements for the game 602 (e.g., the game 602 includes settings that requires a celebratory explosion effect to expand side emotive lighting devices, but not necessarily to upper or lower emotive lighting devices). The minimum locality presentation requirements thus specify required locations (e.g., on emotive lighting devices for the wagering game machine 660), where required portions of an emotive lighting effect must be presented to meet the minimal functional requirements of the emotive lighting effect. The emotive light controller 664, thus, can give control of the side emotive light bar 620 to the game 602 and give control of the top emotive light bar 618 to the bank show controller 640 (i.e., as indicated in the results queue 614).

Similarly, the system 600 can determine, according to minimal locality requirements, that the bank show 601 does not require the use of the side emotive light bar 620. If the bank show 601 did require the use of the side emotive light bar 620, according to its minimal locality requirements, then the emotive light controller 664 could refrain from overriding priority for the game effect 603. If the priority values for the bank show 601 and the game effect 603 are different, the system 600 can override the presentation priority of higher priority lighting command (e.g., the game effect 603, which has the higher priority) but only for the specific emotive lighting devices (e.g., the side emotive light bar 620) that meet the minimal functional requirements for the lower lighting commands (e.g., the bank show 601, which has the lower priority). In some embodiments, however, the emotive light controller 664 may determine that although the lower priority command (e.g., the bank show 601) may utilize the top emotive light bar 618 without significant distraction to the player, if the game 602 produces a lighting command with priority values within a certain range (e.g., a very high range of priority values), the emotive light controller 664 would refrain from overriding the priority. For example, a celebratory effect for a very high win amount may have a very high priority value, assigned by an operator during configuration, because the operator believes that the celebratory effect would have a greater advertising effect on patrons than a bank attract would. The emotive light controller 664, thus, could refrain from overriding priorities that are inside the range of higher priority values. Thus, when the game 602 produces a very high priority game effect (e.g., a celebratory effect for a very high win amount) the emotive light controller 664 could refrain from overriding any portion of the very high priority game effect and thus give full priority to the very high priority game effect to utilize both the top emotive light bar 618 and the side emotive light bar 620. In some embodiments, the system 600 may also split priorities for other devices such as peripheral displays. Returning to FIG. 3, in some embodiments, the system can determine that priorities levels are the same (e.g., equally as high) for lighting commands from more than one source. The system can determine, based on a hierarchy of rules, which lighting command will receive priority. For example, the system may determine that emotive light data that comes from an application is generally given preference over other types of data, unless the priority values from the other types of data are within a high enough value range. In some embodiments, the system can hold priority in stasis during non-responsive activity of an activated process, such as holding the priority in stasis if downloading information. For instance, the system can determine that a lighting command from an application has the highest priority at a given time, but the application needs to download data or perform some other activity that may delay the presentation of the lighting command. The system can allow other commands (e.g., a bank attract in process) to precede the priority of the application's lighting command during the download or during the performance of the other delaying activity, but as soon as the download is ready to present, or the other delaying activity has completed, the system can reinstate the original priority.

Additional Example Operating Environments

This section describes example operating environments, systems and networks, and presents structural aspects of some embodiments.

Wagering Game Machine Architecture

Figure 7:
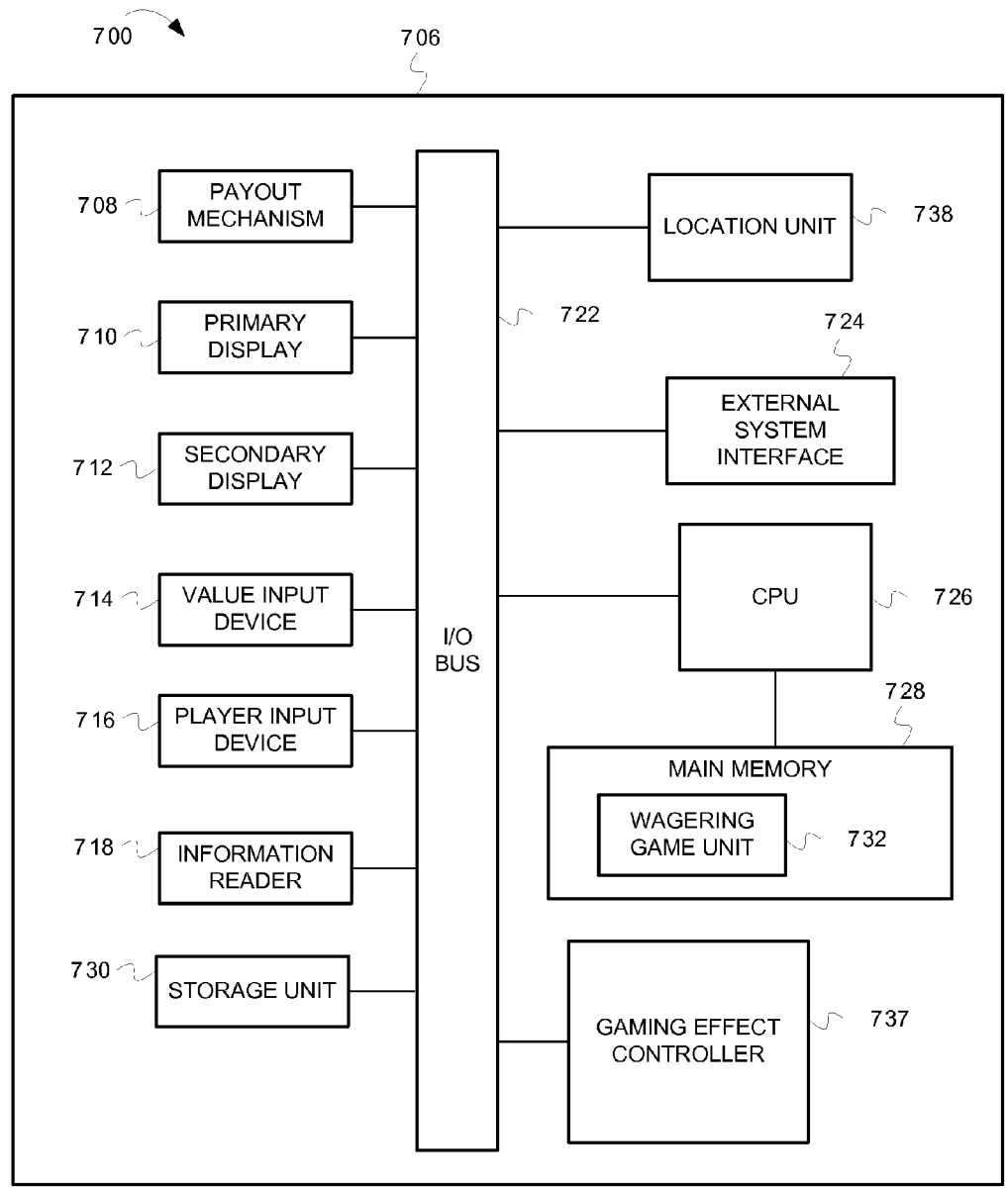
FIG. 7 is an illustration of a wagering game machine architecture 700, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video black jack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes a gaming effect controller 737. The gaming effect controller 737 can process communications, commands, or other information, where the processing can control wagering game content and effects (e.g., light effects, sound effects, etc.).

Furthermore, any component of the wagering game machine 706 can include hardware, firmware, and/or machine-readable media including instructions for performing the operations described herein.

Wagering Game Machine

Figure 8:
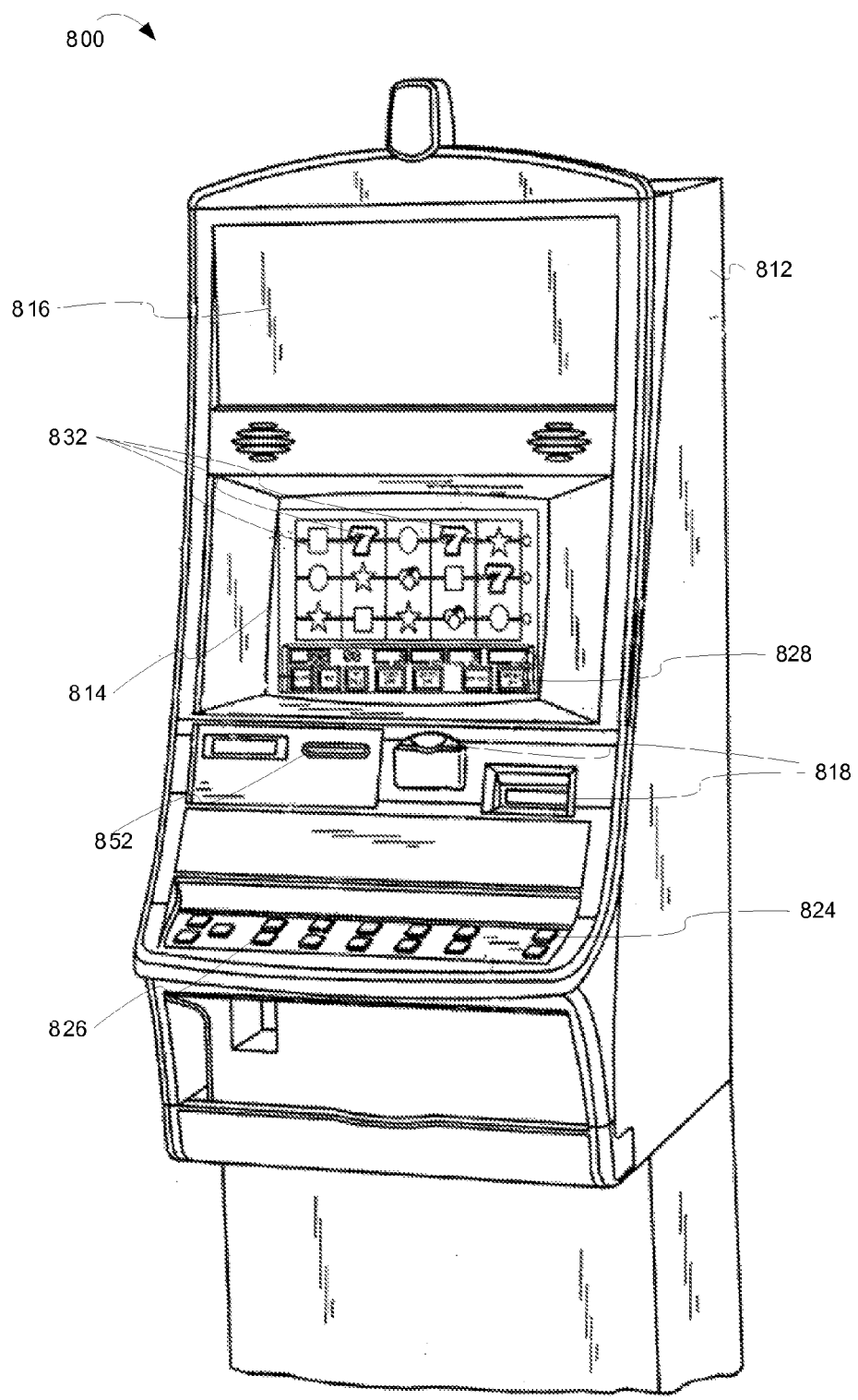
FIG. 8 is an illustration of a wagering game machine 800, according to some embodiments.

FIG. 8 is a conceptual diagram that illustrates an example of a wagering game machine 800, according to some embodiments. Referring to FIG. 8, the wagering game machine 800 can be used in gaming establishments, such as casinos. According to some embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bar top model, mobile handheld model, or workstation console model.

A player begins playing a basic wagering game by making a wager via the value input device 818. The player can initiate play by using the player input device's buttons or touch screen 828. The basic game can include arranging a plurality of symbols along a pay line 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method of operating a gaming system primarily dedicated to providing at least one casino wagering game, the gaming system including a plurality of wagering game machines and one or more controllers, the method comprising:

selecting, by one or more processors of the one or more controllers, a plurality of content presentation devices for presentation of a gaming effect, wherein the plurality of content presentation devices comprise video, sound production or lighting devices associated with a plurality of wagering game machines, wherein each of the plurality of content presentation devices has an identifier, and wherein a portion of the gaming effect is configured to be synchronized across the plurality of content presentation devices and the plurality of wagering game machines, and wherein the portion of the gaming effect is presented without interruption via the plurality of content presentation devices during a time interval;

receiving, into a non-transitory machine-readable medium coupled to the one or more content controllers, presentation status information for at least one of the plurality of content presentation devices, wherein the presentation status indicates a state of availability of the at least one of the video, sound production or lighting devices;

determining, by the one or more controllers, based on the presentation status information, that the at least one of the plurality of content presentation devices is unavailable to present the portion of the gaming effect during the time interval; and utilizing, by the one or more processors of the one or more controllers, the presentation status information and the identifier for each of the plurality of content presentation devices to generate a transmission schedule in the non-transitory machine-readable medium, that synchronizes timing of transmissions of content control data for the gaming effect to the plurality of content presentation devices, wherein the transmission schedule is configured to schedule content control data to be sent to eligible content presentation devices using the identifier for each eligible content presentation device of the eligible content presentation devices, and wherein the transmission schedule omits the at least one of the plurality of content presentation devices that is unavailable to present the portion of the gaming effect based, at least in part, on the presentation status information and the identifier of the at least one of the plurality of content presentation devices that is unavailable to present the portion of the gaming effect.

2. The computer-implemented method of claim 1, further comprising:

determining a first presentation priority value associated with a content presentation event that occurs via at least one of the plurality of wagering game machines associated with the at least one of the plurality of content presentation devices;

determining a second presentation priority value associated with the gaming effect; and determining that the first presentation priority value exceeds the second presentation priority value in presentation importance.

3. The computer-implemented method of claim 2, wherein the content presentation event comprises one or more of a lighting event that requires access to the at least one of the plurality of content presentation devices and a wagering game related event that prohibits use of the at least one of the plurality of content presentation devices.

4. The computer-implemented method of claim 1 further comprising:

monitoring the presentation status information for a change in one or more events that affect the state of availability;

determining, based on the presentation status information, that the one or more events make the at least one of the plurality of content presentation devices eligible to present the gaming effect after the time interval; and sending content control data to the at least one of the plurality of content presentation devices to present additional portions of the gaming effect.

5. The computer-implemented method of claim 1, wherein the presentation status information includes an indication of lighting data sent from one or more lighting control sources to the at least one of the plurality of content presentation devices, and further comprising:

determining, from the presentation status information, that the one or more lighting control sources have priority access to the at least one of the plurality of content presentation devices.

6. The computer-implemented method of claim 1 further comprising:

determining that the portion of the gaming effect includes a distinct content element that is distinct from other content elements of the gaming effect; and determining that the distinct content element would be omitted from a presentation of the portion of the gaming effect in response to the determining that the at least one of the plurality of presentation devices is unavailable.

7. The computer-implemented method of claim 6, wherein the distinct content element is used, via the gaming effect, to indicate a potential game outcome, and wherein the distinct content element is required to be presented continuously during the gaming effect.

8. The computer-implemented method of claim 1, wherein the identifier comprises a network address of the at least one of the plurality of content presentation devices.

9. The computer-implemented method of claim 8 further comprising:

determining, based on the presentation status information, eligible lighting devices, from the plurality of content presentation devices, that are eligible to present the portion of the gaming effect;

including the eligible lighting devices in the transmission schedule; and transmitting the content control data, according to the transmission schedule, to the eligible lighting devices.

10. The method of claim 1, and further comprising:

determining that a second content presentation device is associated with the at least one of the plurality of the content presentation devices that is unavailable;

excluding the second content presentation device irrespective of the state of availability of the second content presentation device.

11. One or more non-transitory machine-readable media having instructions stored thereon, which when executed by a set of one or more processors cause the set of one or more processors to perform operations for operating a gaming system primarily dedicated to providing at least one casino wagering game, the gaming system including a plurality of wagering game machines and one or more controllers, the operations comprising:

selecting a plurality of content presentation devices for presentation of a gaming effect synchronized across a plurality of associated wagering game machines arranged in a bank configuration, wherein the gaming effect is configured to be presented without interruption via the plurality of content presentation devices, wherein the plurality of content presentation devices comprise video, sound production or lighting devices associated with the plurality of wagering game machines, and wherein each of the plurality of content presentation devices has an identifier;

receiving presentation status information for the plurality of presentation devices, wherein the presentation status information indicates one or more events that affect states of availability of the video, sound production or lighting devices to present the gaming effect;

determining, based on the presentation status information, a first one or more of the plurality of presentation devices that are ineligible to present the gaming effect;

determining, based on the presentation status information, a second one or more of the plurality of presentation devices that are eligible to present the gaming effect; and utilizing the presentation status information and the identifier for each of the plurality of content presentation devices to generate a transmission schedule that synchronizes timing of transmissions of gaming-effect control data for the gaming effect to the plurality of content presentation devices, wherein the transmission schedule is configured to schedule content control data to be sent to the second one or more of the plurality of presentation devices using the identifier for each of the second one or more of the plurality of presentation devices, and wherein the transmission schedule omits the first one or more of the plurality of presentation devices that are ineligible to present the gaming effect based, at least in part, on the presentation status information and the identifier of the at least one of the first one or more of the plurality of presentation devices.

12. The one or more non-transitory machine-readable media of claim 11, wherein the operation for providing the gaming-effect control data includes operations further comprising:

transmitting the gaming-effect control data to addresses only associated with the second one or more of the plurality of presentation devices.

13. The one or more non-transitory machine-readable media of claim 11 said operations further comprising:

determining that the gaming effect includes a content element that indicates a gaming outcome for a secondary wagering game;

determining that the one or more events occur for primary games via a portion of the plurality of associated wagering game machines for the first one or more of the plurality of presentation devices;

determining that the one or more events have priority access to the first one or more of the plurality of presentation devices; and excluding the first one or more of the plurality of presentation devices from transmission of the gaming-effect control data in response to the operation for determining that the one or more events have priority access to the first one or more of the plurality of presentation devices.

14. The one or more non-transitory machine-readable media of claim 13 said operations further comprising:

determining that omission of the content element would interrupt a presentation of the gaming outcome for the secondary wagering game.

15. A gaming system primarily dedicated to providing casino wagering games, the system comprising:

a wagering game machine including:
  a gaming cabinet for housing components associated with a casino wagering game,
  a display device coupled to the gaming cabinet, and
  a value input device coupled to the gaming cabinet, the value input device configured to receive a physical input from a player to initiate the casino wagering game and transform the input into an electronic data signal;
one or more computer processors;
a random number generator configured to generate one or more random numbers;
a status control module configured to, via the one or more computer processors,
  provide status information for at least one presentation device from a plurality of presentation devices, wherein the status information indicates a state of availability of the at least one presentation device to present a synchronized gaming content presentation, wherein the synchronized gaming content presentation is initiated based on an outcome determined based on an output of the random number generator, and wherein each of the plurality of presentation devices has an identifier; and
a content controller configured to, via the one or more computer processors,
  generate content control data for the synchronized gaming content presentation, wherein the content control data controls timing of the synchronized gaming content presentation on the plurality of presentation devices, and wherein the synchronized gaming content presentation is configured to be presented continuously, and without interruption, across the plurality of presentation devices,
  receive the status information for the at least one presentation device, the presentation device comprising a video, sound production or lighting device associated with the wagering game machine, the status information indicating an availability of the video, sound production or lighting device,
  determine, based on the status information, that the at least one presentation device is unavailable to participate in the synchronized gaming content presentation, and
  utilize, by the one or more computer processors, the status information and the identifier for each of the plurality of presentation devices to determine a transmission schedule stored in a machine-readable medium, wherein the transmission schedule synchronizes timing of transmissions of the content control data for synchronized gaming content presentation to the plurality of presentation devices, wherein the transmission schedule is configured to schedule the content control data to be sent to eligible presentation devices using the identifier for each eligible presentation device of the eligible presentation devices, and wherein the transmission schedule omits the at least one presentation device based, at least in part, on the status information and the identifier of the at least one presentation device.

16. The system of claim 15 further comprising:
an additional content controller configured to
  provide additional content control data related to a gaming effect that is separate from the synchronized gaming content presentation, and
  provide a first priority value with the additional content control data, wherein the first priority value indicates a presentation priority for the additional content control data to access the at least one presentation device; and wherein
the status control module is further configured to
  receive the additional content control data,
  determine the first priority value from the additional content control data, and
  include the first priority value in the status information, and wherein the content controller is further configured to
  determine a second priority value associated with the content control data,
  determine that the first priority value exceeds the second priority value,
  determine that the additional content controller has priority access to the at least one presentation device and, in response, omit presentation of at least a portion of the synchronized gaming content presentation, and
  exclude the at least one presentation device from a transmission of the content control data.

17. The system of claim 16, wherein one or more of the content controller and the additional content controller comprises one or more of a wagering game application, a wagering game server, a casino-network emotive lighting controller, a community wagering game server, and a wagering game machine bank controller.

18. An apparatus comprising:
  means for selecting a plurality of content presentation devices for presentation of a gaming effect, wherein the plurality of content presentation devices comprise lighting devices, sound production devices, or one or more peripheral devices associated with a plurality of wagering game machines;
  means for determining that the gaming effect includes a distinct content element that is distinct from other content elements of the gaming effect, wherein the distinct content element is required to be presented at all times, without interruption, via one or more of the plurality of content presentation devices for a time interval during which the gaming effect is presented;
  means for receiving presentation status information for at least one content presentation device from the plurality of content presentation devices, wherein the presentation status information indicates a state of availability of at least one lighting device, sound production device, or peripheral device to present the distinct content element from the gaming effect, and wherein each of the plurality of content presentation devices has an identifier;
  means for determining, based on the presentation status information, that the at least one content presentation device is unavailable to present the distinct content element from the gaming effect during the time interval;
  means for determining that the at least one content presentation device would omit the presentation of the distinct content element during the time interval based on the at least one content presentation device being unavailable; and
  means for utilizing the presentation status information and the identifier for each of the plurality of content presentation devices to generate a transmission schedule that presents the distinct content element, wherein the transmission schedule is configured to schedule content control data to be sent to eligible presentation devices using the identifier for each of the eligible presentation devices, and wherein the transmission schedule omits the at least one content presentation device based, at least in part, on the presentation status information and the identifier of the at least one content presentation device.

19. The apparatus of claim 18, wherein the distinct content element is a visually distinct lighting element that indicates a potential gaming outcome associated with the gaming effect.

20. The apparatus of claim 18, wherein the distinct content element is an audibly distinct sound element that indicates a potential gaming outcome associated with the gaming effect.

21. The apparatus of claim 18, wherein the plurality of content presentation devices are adjacent to each other in a bank configuration of the plurality of wagering game machines, and wherein the gaming effect is configured to present a continuous movement across the plurality of content presentation devices without a distinguishable interruption in the continuous movement.

* * * * *